(12) United States Patent
Deng et al.

(10) Patent No.: US 11,122,798 B2
(45) Date of Patent: Sep. 21, 2021

(54) MODULATION OF RELEASE RATE FROM MICROENCAPSULATED PESTICIDES

(71) Applicant: Monsanto Technology LLC, St. Louis, MO (US)

(72) Inventors: Wenjin Deng, St. Louis, MO (US); Todd Charles Friedman, Arnold, MO (US); John W. Hemminghaus, St. Louis, MO (US); Liwei Yuan, Chesterfield, MO (US); Junhua Zhang, Chesterfield, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 16/819,932

(22) Filed: Mar. 16, 2020

(65) Prior Publication Data

US 2020/0281196 A1  Sep. 10, 2020

Related U.S. Application Data

(62) Division of application No. 14/989,506, filed on Jan. 6, 2016, now Pat. No. 10,638,751.

(60) Provisional application No. 62/100,421, filed on Jan. 6, 2015.

(51) Int. Cl.
| | |
|---|---|
| *A01N 25/28* | (2006.01) |
| *A01N 25/02* | (2006.01) |
| *A01N 37/22* | (2006.01) |
| *A01N 37/40* | (2006.01) |
| *A01N 41/10* | (2006.01) |
| *A01N 57/20* | (2006.01) |
| *A01N 37/26* | (2006.01) |

(52) U.S. Cl.
CPC ............ *A01N 25/28* (2013.01); *A01N 25/02* (2013.01); *A01N 37/22* (2013.01); *A01N 37/26* (2013.01); *A01N 37/40* (2013.01); *A01N 41/10* (2013.01); *A01N 57/20* (2013.01)

(58) Field of Classification Search
CPC ........ A01N 37/26; A01N 25/28; A01N 37/40; A01N 57/20; A01N 37/22; A01N 25/02; A01N 41/10
See application file for complete search history.

(56) References Cited

U.S. PATENT DOCUMENTS

| | | | |
|---|---|---|---|
| 4,936,901 A | 6/1990 | Surgant et al. | |
| 5,256,630 A | 10/1993 | Bussler | |
| 5,912,207 A | 6/1999 | Scher et al. | |
| 5,925,595 A | 7/1999 | Seitz et al. | |
| 8,129,564 B2 | 3/2012 | Prosch et al. | |
| 2004/0137031 A1 | 7/2004 | Seitz et al. | |
| 2005/0277549 A1 | 12/2005 | Seitz et al. | |
| 2008/0242546 A1 | 10/2008 | Schultz et al. | |
| 2010/0248963 A1* | 9/2010 | Becher | A01N 37/26 504/127 |
| 2011/0251064 A1 | 10/2011 | Cannan et al. | |
| 2012/0286438 A1 | 11/2012 | Bernardini et al. | |
| 2013/0029847 A1 | 1/2013 | Findley et al. | |
| 2014/0080706 A1 | 3/2014 | Schnabel et al. | |
| 2014/0128264 A1 | 5/2014 | Hemminghaus et al. | |
| 2014/0213450 A1 | 7/2014 | Nelson | |
| 2015/0264924 A1 | 9/2015 | Hemminghaus et al. | |
| 2016/0332914 A1* | 11/2016 | Gadt | C04B 24/2629 |

FOREIGN PATENT DOCUMENTS

| | | |
|---|---|---|
| EP | 0017409 A1 | 10/1980 |
| WO | 200194001 A2 | 12/2001 |
| WO | 2010093970 A3 | 8/2010 |
| WO | 2012104237 A2 | 9/2012 |

OTHER PUBLICATIONS

Dingman, J., Jr., et al., "Concentration and Separation of Trace Metal Cations by Complexation on Polyamkine-Polyurea Resins," 1972, Anal Chem, 44/8:1351-1357.

Mohamed, A.A., et al., "New Complexes of Polyurea with Copper (II), Manganese (II) and Chromium (III) (Synthesis and Characterization)," 2010, Natl J Chem, 38:333-348.

Corn and Soybean Herbicide Chart, University of Wisconsin-Extension, College of Agricultural and Life Sciences, not dated, 3 pages.

Product Information Sheet, Borresperse Ca, CAS No. 8061-52-7, Publication No. LTD 5502401, Dated Apr. 14, 2004, Borregaard LignoTech, Karlsruhe, Germany, 1 page.

Specimen Product Label, SURESTART Herbicide, EPA Reg. No. 62719-570, Dow Chemical Company, Revised Feb. 26, 2013, 8 pages.

Specimen Product Label, TRIPLEFLEX Herbicide, EPA Reg. No. 62719-570-524, Monsanto Company, Jan. 2010, 6 pages.

Herbicide Premixes, prepared by Thompson, Peterson, Fick, Stahlman, Wolfe, Kansas City University, not dated, 3 pages.

* cited by examiner

*Primary Examiner* — Johann R Richter
*Assistant Examiner* — Danielle Sullivan
(74) *Attorney, Agent, or Firm* — Stinson LLP

(57) ABSTRACT

Aqueous pesticidal mixtures comprising a microencapsulated pesticide and an agent that modulates the release rate of the pesticide from the microcapsules are described. Also described are various methods of modulating the release rate of a microencapsulated pesticide in a pesticidal mixture. Further, various pesticidal mixtures comprising a microencapsulated pesticide and a co-pesticide that provides for enhanced crop safety are described.

20 Claims, 4 Drawing Sheets

US 11,122,798 B2

MODULATION OF RELEASE RATE FROM MICROENCAPSULATED PESTICIDES

REFERENCE TO RELATED APPLICATIONS

This application is a division of U.S. Nonprovisional application Ser. No. 14/989,506, filed Jan. 6, 2016, issued as U.S. Pat. No. 10,638,751, which claims the benefit of U.S. Provisional Application No. 62/100,421, filed Jan. 6, 2015, the entire disclosure of which is incorporated herein by reference.

FIELD OF THE INVENTION

The present invention generally relates to various aqueous pesticidal mixtures comprising a microencapsulated pesticide and an agent that modulates the release rate of the pesticide from the microcapsules. The present invention also relates to various methods of modulating the release rate of a microencapsulated pesticide in a pesticidal mixture. The present invention further relates to various pesticidal mixtures comprising a microencapsulated pesticide and a co-pesticide that provides for enhanced crop safety.

BACKGROUND OF THE INVENTION

Microencapsulation of pesticides is one method for controlling the release of the pesticide after application, particularly when sustained or slow release of the pesticide is desired. In the case of some herbicides, the release rate needs to be controlled so that crop injury can be managed. For example, in the case of acetamide herbicides, sustained release is desired because injury in certain susceptible crops has been observed with application sprays prepared from conventional emulsifiable concentrate formulations (non-encapsulated herbicide formulations). Also, slower release can beneficially provide longer residual activity for pest control.

To form microcapsules, the pesticide is encapsulated in a polymeric shell wall material. The pesticide is released from the microcapsules at least in part by molecular diffusion through the shell wall. Several factors including the type of pesticide, type of polymer, shell thickness, shell porosity, particle size, and presence of safeners impact the rate of release of the pesticide from the microcapsules. Modification of these factors to increase or decrease pesticide release rate has definite limitations. Also, once the microcapsules are formulated, the release rate is generally fixed and not tunable. Thus, there remains a need for formulations containing microencapsulated pesticides in which the rate of release of the pesticide is modulated or tunable to provide the desired level of pest control and avoid negative impacts such as crop injury in the case of herbicides.

With regard to herbicides, the emergence of certain herbicide resistant weeds has generated interest in developing strategies to supplement the action of primary herbicides such as glyphosate. Acetamide herbicides are known as effective residual control herbicides that reduce early season weed competition. In particular, acetamide herbicides such as acetochlor provide outstanding residual control of many grasses and broadleaf weeds including pigweed, waterhemp, lambsquarters, nightshade, foxtails, among others. Acetamides are generally classified as seedling growth inhibitors. Seedling growth inhibitors are absorbed and translocated in plants from germination to emergence primarily by subsurface emerging shoots and/or seedling roots. Acetamide herbicides typically do not offer significant post-emergence activity, but as a residual herbicide provide control of newly emerging monocots and small-seeded dicot weed species. This supplements the activity of post-emergent herbicides that lack significant residual activity.

Crop injury caused by application of acetamide herbicides necessitated strategies to reduce this effect including microencapsulating the herbicide. Methods for producing microencapsulated acetamides are described in various patents and publications including U.S. Pat. No. 5,925,595; U.S. Publication No. 2004/0137031; and U.S. Publication No. 2010/0248963.

Herbicide compositions containing a combination of herbicides with multiple modes of action that can supplement the action of primary herbicides such as glyphosate are especially suited for controlling growth of unwanted plants, including those with selected herbicide resistance. However, the release properties of herbicidal concentrates of microencapsulated acetamide herbicides can be sensitive to the inclusion of further additives including co-herbicides. Accordingly, there remains a need for highly concentrated herbicidal compositions containing microencapsulated acetamide herbicides and co-herbicides that can be economically produced while maintaining the release properties of the microencapsulated acetamide herbicide and that can be diluted to provide effective spray formulation solutions for application to unwanted plants.

SUMMARY OF THE INVENTION

Briefly, aspects of the present invention are directed to aqueous pesticidal concentrate compositions comprising:

(a) at least one particulate microencapsulated pesticide dispersed in a liquid medium comprising a water-immiscible core material comprising the pesticide and a polyurea shell wall containing the core material, wherein the pesticide concentration in the composition on an active ingredient basis is at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % and wherein the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea and wherein the ratio of amine molar equivalents contained in the polyamine component to isocyanate molar equivalents contained in the polyisocyanate component is at least 1.01:1; and (b) a release modulating agent comprising a polyvalent metal cation, wherein the molecular weight of the release modulating agent is no greater than about 1000 g/mol, and wherein the ratio of moles of polyvalent metal cation to amine molar equivalents contained in the polyamine component is from about 0.05:1 to about 10:1.

Various aspects of the present invention are directed to aqueous herbicidal concentrate compositions comprising:

(a) at least one particulate microencapsulated acetamide herbicide dispersed in an aqueous liquid medium comprising a water-immiscible core material comprising the acetamide herbicide and a polyurea shell wall containing the core material, wherein the acetamide herbicide concentration in the composition on an active ingredient basis is at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % and wherein the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea and wherein the ratio of amine molar equivalents contained in the polyamine component to isocyanate molar equivalents contained in the polyisocyanate component is at least 1.01:1; and (b) a release modulating agent comprising a polyvalent metal cation, wherein the molecular weight of the release modulating agent is no greater than about 1000 g/mol, and wherein the ratio of moles of polyvalent metal cation to amine molar equivalents contained in the polyamine component is from about 0.05:1 to about 10:1.

Further aspects of the present invention are directed to liquid herbicidal mixtures comprising:

(a) at least one particulate microencapsulated acetamide herbicide dispersed in an aqueous liquid medium comprising a water-immiscible core material comprising the acetamide herbicide and a polyurea shell wall containing the core material;

(b) a release modulating agent comprising a polyvalent metal cation, wherein the molecular weight of the release modulating agent is no greater than about 1000 g/mol; and (c) an acidic co-herbicide.

Other aspects of the present invention are directed to aqueous herbicidal concentrate compositions comprising:

(a) at least one particulate microencapsulated acetamide herbicide dispersed in an aqueous liquid medium comprising a water-immiscible core material comprising the acetamide herbicide and a polyurea shell wall containing the core material, wherein the acetamide herbicide concentration in the composition on an active ingredient basis is at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. %, and (b) an alkali metal salt of an auxin herbicide dissolved in the aqueous liquid medium, wherein the auxin herbicide concentration in the composition on an acid equivalent basis is at least about 1 wt. %, at least about 5 wt. %, or at least 10 wt. %.

The present invention is also directed to various methods of modulating the release rate of a microencapsulated pesticide in a pesticidal mixture, the method comprising:

mixing the microencapsulated pesticide, a release modulating agent comprising a polyvalent metal cation, and solvent to form the pesticidal mixture, wherein the microencapsulated pesticide comprises a water-immiscible core material comprising the pesticide and a polyurea shell wall containing the core material, the polyurea shell wall being formed in a polymerization medium by a polymerization reaction between a polyisocyanate component comprising a polyisocyanate or mixture of polyisocyanates and a polyamine component comprising a polyamine or mixture of polyamines to form the polyurea and the ratio of amine molar equivalents contained in the polyamine component to isocyanate molar equivalents contained in the polyisocyanate component is at least 1.01:1, and wherein the molecular weight of the release modulating agent is no greater than about 1000 g/mol and the ratio of moles of polyvalent metal cation to amine molar equivalents contained in the polyamine component is from about 0.05:1 to about 10:1.

Further, various methods of the present invention include methods of modulating the release rate of a microencapsulated acetamide herbicide in an aqueous herbicidal mixture, the method comprising:

mixing the microencapsulated acetamide herbicide, a release modulating agent comprising a polyvalent metal cation, and water to form the aqueous herbicidal mixture, wherein the microencapsulated acetamide herbicide comprises a water-immiscible core material comprising the acetamide herbicide and a polyurea shell wall containing the core material, the polyurea shell wall being formed in a polymerization medium by a polymerization reaction between a polyisocyanate component comprising a polyisocyanate or mixture of polyisocyanates and a polyamine component comprising a polyamine or mixture of polyamines to form the polyurea and the ratio of amine molar equivalents contained in the polyamine component to isocyanate molar equivalents contained in the polyisocyanate component is at least 1.01:1, and wherein the molecular weight of the release modulating agent is no greater than about 1000 g/mol and the ratio of moles of polyvalent metal cation to amine molar equivalents contained in the polyamine component is from about 0.05:1 to about 10:1.

Other objects and features will be in part apparent and in part pointed out hereinafter.

DESCRIPTION OF THE PREFERRED EMBODIMENTS

Figure 1:
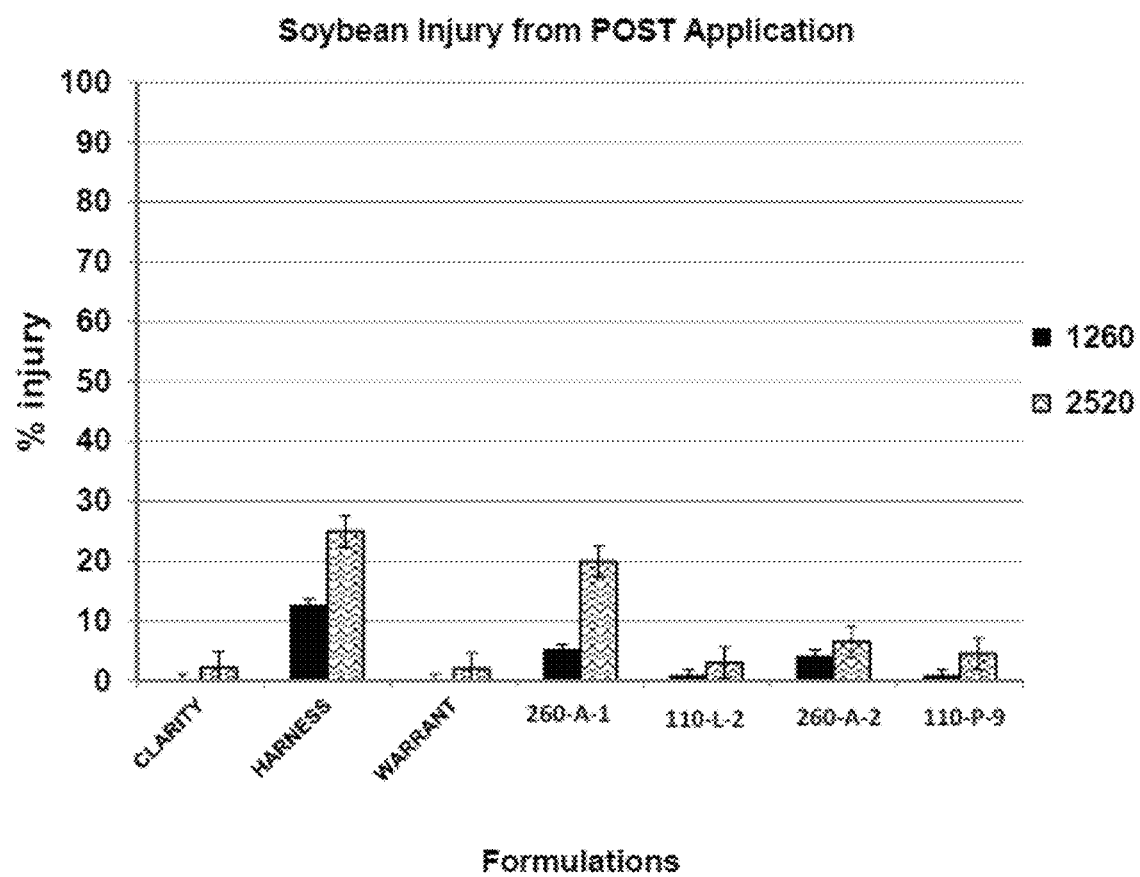
FIGS. 1 and 2 show the results for crop injury tests for soybean and cotton, respectively.

Various aspects of the present invention are directed to various liquid pesticidal mixtures comprising a microencapsulated pesticide (e.g., an acetamide herbicide such as acetochlor) and an agent that modulates the release rate of the pesticide from the microcapsules. In particular, the microencapsulated pesticide can include a polyurea shell wall containing the pesticide. The release modulating agent generally comprises a polyvalent metal cation.

One aspect of the present invention is directed to liquid pesticidal mixtures comprising a microencapsulated pesticide and methods of preparing these mixtures where a release modulating agent is formulated with the microencapsulated pesticide. An agent that can variably modulate the release rate of the microencapsulated pesticide affords a flexible solution for providing pesticidal formulations having a range of different release rates without altering the microencapsulation process. Microencapsulation processes can be highly sensitive or highly optimized processes where additional components can greatly impact the quality or properties of the microcapsules. Release modulating agents that can be added after the microencapsulation process are especially advantageous because impacts on the microencapsulation process can be avoided.

A further aspect of the present invention is directed to liquid herbicidal mixtures comprising a microencapsulated pesticide (e.g., acetamides such as acetochlor) and methods of preparing these mixtures where a release modulating agent is formulated with the microencapsulated herbicide. An agent that can variably modulate the release rate of the microencapsulated herbicide can provide enhanced crop safety (e.g., for sensitive crops) and/or increased residual efficacy.

Another aspect of the present invention is directed to liquid pesticidal mixtures comprising a microencapsulated pesticide and a co-pesticide that increases the release rate of the microencapsulated pesticide when formulated (e.g., formulated as a pre-mix concentrate) and methods of preparing these mixtures where a release modulating agent is formulated with the pesticidal mixture. It has been discovered that some co-pesticides can increase the release rate of the microencapsulated pesticide when mixed together. Increasing the release rate of the microencapsulated pesticide may not be desirable for various applications. Thus, a release modulating agent that can control or reduce the impacts to the release rate of the microencapsulated pesticide caused by the co-pesticide is beneficial for various applications.

Yet another aspect of the present invention is directed to liquid herbicidal mixtures comprising a microencapsulated herbicide (e.g., acetamide herbicides such as acetochlor) and a co-herbicide (e.g., an acidic co-herbicide such as dicamba) that increases the release rate of the microencapsulated herbicide when formulated (e.g., formulated as a pre-mix concentrate) and methods of preparing these mixtures where a release modulating agent is formulated with the herbicidal mixture. It has been found that some co-herbicides can increase the release rate of the microencapsulated pesticide when mixed. Increasing the release rate of the microencapsulated herbicide may not be desirable for applications where injury to sensitive crops is a concern or for applications where prolonged residual efficacy against weeds is desired. Thus, a release modulating agent that can control or reduce the impacts to the release rate of the microencapsulated herbicide caused by the co-herbicide is beneficial for various applications.

Still other aspects of the present invention are directed to various aqueous herbicidal concentrate compositions comprising a microencapsulated acetamide herbicide in combination with an alkali metal salt of certain co-herbicides. As noted, it has been found that some co-herbicides (e.g., acidic co-herbicides such as dicamba) can increase the release rate of the microencapsulated acetamide herbicide, which can potentially cause injury to sensitive crops. It has been surprisingly discovered that the use of alkali metal salts of the co-herbicide can provide enhanced crop safety, particularly when compared to conventional amine salts (e.g., amine salts of dicamba such as diglycolamine and dimethylamine).

Microencapsulation

As noted, various liquid pesticidal mixtures of the present invention (e.g., aqueous herbicidal concentrate compositions) comprise at least one particulate microencapsulated pesticide comprising a core material comprising the pesticide and a shell wall containing the core material. The process of microencapsulation can be conducted according to known interfacial polycondensation techniques. Microencapsulation of water-immiscible materials utilizing an interfacial polycondensation reaction generally involves dissolving a first reactive monomeric or polymeric material(s) (first shell wall component) in the material to be encapsulated to form the oil or discontinuous phase liquid. The discontinuous phase liquid is then dispersed into an aqueous or continuous phase liquid to form an oil-in-water emulsion. The continuous phase (aqueous) liquid may contain a second reactive monomeric or polymeric material (second shell wall component) at the time the discontinuous phase is dispersed into the continuous phase. If this is the case, the first and second shell wall components will immediately begin to react at the oil-in-water interface to form a polycondensate shell wall around the material to be encapsulated. However, the oil-in-water emulsion can also be formed before the second shell wall component is added to the emulsion.

At least a portion of the pesticide of the liquid pesticidal mixture of the present invention is encapsulated with a polyurea shell wall. In general, the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea. See, for example, U.S. Pat. No. 5,925,595; U.S. Publication No. 2004/0137031; and U.S. Publication No. 2010/0248963, which are incorporated herein by reference.

The pesticides encapsulated with a polyurea shell wall for use in the present invention can be prepared by contacting an aqueous continuous phase containing a polyamine component comprising a polyamine source and a discontinuous oil phase containing the pesticide and a polyisocyanate component comprising a polyisocyanate source. A polyurea shell wall is formed in a polymerization reaction between the polyamine source and the isocyanate source at the oil/water interface thereby forming a capsule or microcapsule containing the pesticide.

The polyurea polymer shell wall of the microcapsules may be formed using one or more polyisocyanates, i.e., having two or more isocyanate groups per molecule. A wide variety of polyisocyanates can be employed. For example, the polyisocyanate component can comprise an aliphatic polyisocyanate (e.g., DESMODUR W, DESMODUR N 3200 and DESMODUR N 3215). In some embodiments, the polyurea shell wall is formed using a blend of at least two polyisocyanates. For example, the polyurea shell wall is formed in an interfacial polymerization reaction using at least one diisocyanate and at least one triisocyanate (e.g., a combination of DESMODUR W and DESMODUR N 3200 or N 3215).

The polyamine source can be a single polyamine species or a mixture of two or more different polyamine species. In some embodiments of the present invention, the polyamine source consists essentially of a principal polyamine. As used herein, a principal polyamine refers to a polyamine consisting essentially of a single polyamine species.

It is advantageous to select a polyamine component and a polyisocyanate component such that the polyamine has an amine functionality of at least 2, i.e., 3, 4, 5 or more, and at least one of the polyisocyanates has an isocyanate functionality of at least 2, i.e., 2.5, 3, 4, 5, or more since high amine and isocyanate functionality increases the percentage of cross-linking occurring between individual polyurea polymers that comprise the shell wall. In some embodiments, the polyamine has an amine functionality of greater than 2 and the polyisocyanate is a mixture of polyisocyanates wherein each polyisocyanate has an isocyanate functionality of greater than 2. In other embodiments, the polyamine comprises a trifunctional polyamine and the polyisocyanate component comprises one or more trifunctional polyisocyanates. In yet other embodiments, the shell wall is formed by the reaction between a polyisocyanate or mixture of polyisocyanates with a minimum average of 2.5 reactive groups per molecule and a polyamine with an average of at least three reactive groups per molecule. It is, moreover, advantageous to select concentrations of the polyamine component and the polyisocyanate component such that the polyisocyanate component is substantially completely reacted to form the polyurea polymer. Complete reaction of the polyisocyanate component increases the percentage of cross-linking between polyurea polymers formed in the reaction thereby providing structural stability to the shell wall.

As described, the oil-in-water emulsion that is formed during the interfacial polymerization reaction can be prepared by adding the oil phase to the continuous aqueous phase to which an emulsifying agent has been added (e.g., previously dissolved therein). The emulsifying agent is selected to achieve the desired oil droplet size in the emulsion. The size of the oil droplets in the emulsion is impacted by a number of factors in addition to the emulsifying agent employed and determines the size of microcapsules formed by the process. The emulsifying agent is preferably a protective colloid. Polymeric dispersants are preferred as protective colloids. Polymeric dispersants provide steric stabilization to an emulsion by adsorbing to the surface of an oil drop and forming a high viscosity layer which prevents drops from coalescing. Polymeric dispersants may be surfactants and are preferred to surfactants which are not polymeric, because polymeric compounds form a stronger interfacial film around the oil drops. If the protective colloid is ionic, the layer formed around each oil drop will also serve to electrostatically prevent drops from coalescing. SOKA-LAN (available from BASF), a maleic acid-olefin copolymer, is a preferred protective colloid, as is INVALON (available from Huntsman) and AGNIQUE NSC 11NP (available from BASF), which are naphthalene sulfonate condensates.

Other protective colloids useful in this invention are gelatin, casein, polyvinyl alcohol, alkylated polyvinyl pyrrolidone polymers, maleic anhydride-methyl vinyl ether copolymers, styrene-maleic anhydride copolymers, maleic acid-butadiene and diisobutylene copolymers, sodium and calcium lignosulfonates, sulfonated naphthalene-formaldehyde condensates, modified starches, and modified cellulosics like hydroxyethyl or hydroxypropyl cellulose, and carboxymethyl cellulose.

In various embodiments, the microencapsulation method includes encapsulating core material in a shell wall formed by reacting a polyamine component and a polyisocyanate component in a reaction medium in concentrations such that the reaction medium comprises a molar equivalent excess of amine groups compared to the isocyanate groups. That is, the molar equivalents ratio of amine equivalents to isocyanate equivalents used in preparation of the shell wall of the microcapsules is greater than 1:1. For example, a molar equivalents ratio at least 1.01:1, or at least about 1.05:1 is used to ensure that the isocyanate is completely reacted. The ratio of amine molar equivalents contained in the polyamine component to isocyanate molar equivalents contained in the polyisocyanate component can be from 1.01:1 to about 1.7:1, from 1.01:1 to about 1.6:1, from 1.01:1 to about 1.5:1, from 1.01:1 to about 1.4:1, from 1.01:1 to about 1.3:1, from 1.05:1 to about 1.7:1, from 1.05:1 to about 1.6:1, from 1.05:1 to about 1.5:1, from 1.05:1 to about 1.4:1, or from 1.05:1 to about 1.3:1.

The molar equivalents ratio of amine molar equivalents to isocyanate molar equivalents is calculated according to the following equation:

$$\text{Molar Equivalents Ratio} = \frac{\text{amine molar equivalents}}{\text{isocyanate molar equivalents}} \quad (1)$$

In the above equation (1), the amine molar equivalents is calculated according to the following equation:
molar equivalents=/(polyamine weight/equivalent weight).

In the above equation (1), the isocyanate molar equivalents is calculated according to the following equation:

isocyanate molar equivalents=/(polyisocyanate weight/equivalent weight).

The equivalent weight is generally calculated by dividing the molecular weight in grams/mole by the number of functional groups per molecules and is in grams/mole. For some molecules, such as triethylenetetramine ("TETA") and 4,4'-diisocyanato-dicyclohexyl methane ("DES W"), the equivalent weight is equal to the molecular weight divided by the number of functional groups per molecule. For example, TETA has a molecular weight of 146.23 g/mole and 4 amine groups. Therefore, the equivalent weight is 36.6 g/mol. This calculation is generally correct, but for some materials, the actual equivalent weight may vary from the calculated equivalent weight. In some components, for example, the biuret-containing adduct (i.e., trimer) of hexamethylene-1,6-diisocyanate, the equivalent weight of the commercially available material differs from the theoretical equivalent weight due to, for example, incomplete reaction. The theoretical equivalent weight of the biuret-containing adduct (i.e., trimer) of hexamethylene-1,6-diisocyanate is 159.5 g/mol. The actual equivalent weight of the trimer of hexamethylene-1,6-diisocyanate ("DES N3200"), the commercially available product, is about 183 g/mol. This actual equivalent weight is used in the calculations above. The actual equivalent weight may be obtained from the manufacturer or by titration with a suitable reactant by methods known in the art. The symbol, $\Sigma$, in the amine molar equivalents calculation means that the amine molar equivalents comprises the sum of amine molar equivalents for all polyamines in the reaction medium. Likewise, the symbol, $\Sigma$, in the isocyanate molar equivalents calculation means that the isocyanate molar equivalents comprises the sum of isocyanate molar equivalents for all polyisocyanates in the reaction medium.

Generally, the microcapsules can be characterized as having a mean particle size of at least about 2, 3, 4, 5, 6, 7, 8, 9 or 10 μm. For example, the microcapsules have a mean particle size range of from about 2 μm to about 15 μm, from about 2 μm to about 12 μm, or from about 6 μm to about 15 μm. The capsules or microcapsules are essentially spherical such that the mean transverse dimension defined by any point on a surface of the microcapsule to a point on the opposite side of the microcapsule is essentially the diameter of the microcapsule. The mean particle size of the microcapsules can be determined by measuring the particle size of a representative sample with a laser light scattering particle size analyzer known to those skilled in the art. One example of a particle size analyzer is a Coulter LS Particle Size Analyzer.

As reported in U.S. Publication No. 2010/0248963, it is believed, without being bound to any particular theory, that the combination of increased mean particle size and the shell characteristics resulting from a large excess of unreacted amine groups significantly reduces the release rate. In the case of a herbicide core material, this combination of characteristics reduces the amount of herbicide that crop plants are exposed to following application, thereby providing enhanced crop safety and minimized crop plant injury. It is believed, without being bound to any particular theory, that increased excess of amine groups results in a significant number of unreacted amine functional groups thereby providing a shell having a large number of amine functional groups that are not cross-linked. It is believed that the resulting shell wall is flexible and resistant to rupturing such that the amount of herbicide that crop plants are initially exposed to upon application of a herbicidal formulation containing the microcapsules is reduced. It is further believed that unreacted amine groups may reduce the number of fissures or cracks in the shell wall thereby reducing leakage and flow of herbicide through the shell wall from the core.

Accordingly, in various embodiments, the molar concentration of amine groups from the polyamine component and the molar concentration of isocyanate groups from the at least one polyisocyanate (i.e., one polyisocyanate, a blend of two polyisocyanates, a blend of three polyisocyanates, etc.) in the reaction medium is such that the ratio of the concentration of amine molar equivalents to the concentration of isocyanate molar equivalents is at least about 1.1:1. In various embodiments, the molar equivalents ratio of amine molar equivalents to isocyanate molar equivalents can be at least about 1.15:1, or even at least about 1.20:1. In some embodiments, the molar equivalents ratio is less than about 1.7:1, less than about 1.6:1, less than about 1.5:1, less than about 1.4:1, or even less than about 1.3:1. In various embodiments, the molar equivalents ratio of amine molar equivalents to isocyanate molar equivalents in the polymerization medium is from 1.1:1 to about 1.7:1, from 1.1:1 to about 1.6:1, from 1.1:1 to about 1.5:1, from 1.1:1 to about 1.4:1, from 1.1:1 to about 1.3:1, from about 1.15:1 to about 1.7:1, from about 1.15:1 to about 1.6:1, from about 1.15:1 to about 1.5:1, from about 1.15:1 to about 1.4:1, from about 1.15:1 to about 1.3:1, from 1.2:1 to about 1.7:1, from 1.2:1 to about 1.6:1, from 1.2:1 to about 1.5:1, from 1.2:1 to about 1.4:1, or from 1.2:1 to about 1.3:1. Examples of typical ratios include 1.1, 1.15:1, 1.2:1, 1.25:1, 1.3:1, 1.35:1, 1.4:1, 1.45:1 and 1.5:1.

Further in accordance with the methods described in U.S. Publication No. 2010/0248963, microencapsulated pesticides may be prepared wherein the particles (i.e., capsule or microcapsules) are characterized as having a mean particle size of at least about 7 µm, at least about 8 µm, at least about 9 µm, or at least about 10 µm, and less than about 15 µm or less than 12 µm. In various embodiments, the microencapsulated pesticide can be characterized as having a mean particle size of from about 7 µm to about 15 µm, from about 7 µm to about 12 µm, from about 8 µm to about 12 µm, or from about 9 µm to about 12 µm. In particularly preferred embodiments, the range varies from about 9 µm to about 11 µm.

A diluent, such as a solvent, may be added to change the solubility parameter characteristics of the core material to increase or decrease the release rate of the active from the microcapsule, once release has been initiated. For example, the core material may comprise from 0% to about 35% by weight of a diluent, for example from 0.1 to about 25% by weight, from about 0.5% and about 20% by weight, or from about 1% and 10% by weight. In particular, the core material may comprise 0%, 0.5% 1%, 2%, 3%, 4%, 5%, 6%, 7%, 8%, 10%, 15%, 20%, 25%, 30% or even 35% diluent. The weight ratio of total core material to diluent can be, for example, from 8 to 1, from 10 to 1, from 15 to 1, or from 20 to 1. In some embodiments, the diluent is a water-insoluble organic solvent having a solubility of less than 10, 5, 1, 0.5 or even 0.1 gram per liter at 25° C. Examples of suitable water-insoluble solvents include paraffinic hydrocarbons. Paraffinic hydrocarbons are preferably predominantly a linear or branched hydrocarbon. Examples include pentadecane and ISOPAR V and ISOPAR M. Also, the ratio of weight of core material components compared to weight of shell wall components can be adjusted to further affect the release rate profile of the pesticidal microcapsules.

A wide variety of pesticides can be microencapsulated. In general, the encapsulated pesticide particles can comprise a water-immiscible, agricultural chemical-containing core material encapsulated by a polyurea shell wall, which is preferably substantially non-microporous, such that core material release occurs by a molecular diffusion mechanism, as opposed to a flow mechanism through a pore or rift in the polyurea shell wall. As noted herein, the shell wall may preferably comprise a polyurea product of a polymerization of one or more polyisocyanates and a principal polyamine (and optional auxiliary polyamine).

In accordance with the present invention, the pesticide can comprise a herbicide. Encapsulation is especially suited for acetamide herbicides. Accordingly, various liquid herbicidal mixtures of the present invention comprising at least one particulate microencapsulated acetamide herbicide comprising a water-immiscible core material comprising the acetamide herbicide and a polyurea shell wall containing the core material, wherein the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea and wherein the polyurea shell wall comprises excess amine, wherein the ratio of amine molar equivalents contained in the polyamine component to isocyanate molar equivalents contained in the polyisocyanate component is at least 1.1:1.

Acetamide herbicides suitable for microencapsulation include herbicides such as acetochlor, alachlor, butachlor, butenachlor, delachlor, diethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and combinations thereof. Some acetamide herbicides are available in their free forms, as salts, or as derivatized materials, for example, as esters. In various embodiments, the acetamide herbicide is selected from the group consisting of acetochlor, alachlor, metolachlor, S-metolachlor, dimethenamid, dimethenamid-P, butachlor, and combinations thereof. In certain embodiments, the acetamide herbicide is selected from the group consisting of acetochlor, metolachlor and S-metolachlor. In some embodiments, the acetamide herbicide comprises acetochlor.

Liquid Pesticidal Mixtures

Generally, the encapsulated pesticide particles (e.g., capsules or microcapsules) are dispersed in a liquid medium, preferably aqueous (e.g., water) to form the liquid pesticidal mixture. The pesticide loading of the encapsulated pesticide in the liquid pesticidal mixture is typically from about 5% to about 60% or from about 5% to about 50% by weight on an active ingredient basis, such as 5%, 10%, 15%, 20%, 25%, 30%, 35%, 40%, 45%, 50%, 60%, or ranges between these percentages, by weight on an active ingredient basis.

In various embodiments, the liquid pesticidal mixture is an aqueous herbicidal concentrate composition that contains at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % of a microencapsulated acetamide herbicide on an active ingredient basis. In these and other embodiments, the aqueous herbicidal concentrate composition contains from about 10 wt. % to about 65 wt. %, from about 10 wt. % to about 60 wt. %, from about 10 wt. % to about 50 wt. %, from about 10 wt. % to about 40 wt. %, from about 10 wt. % to about 30 wt. %, from about 15 wt. % to about 65 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 65 wt. %, from about 20 wt. % to about 60 wt. %, from about 20 wt. % to about 50 wt. %, from about 20 wt. % to about 40 wt. %, from about 20 wt. % to about 35 wt. %, from about 20 wt. % to about 30 wt. %, from about 25 wt. % to about 65 wt. %, from about 25 wt. % to about 60 wt. %, from about 25 wt. % to about 50 wt. %, from about 25 wt. % to about 40 wt. %, from about 25 wt. % to about 35 wt. %, from about 30 wt. % to about 65 wt. %, from about 30 wt. % to about 60 wt. %, from about 30 wt. % to about 50 wt. %, from about 30 wt. % to about 40 wt. %, or from about 30 wt. % to about 35 wt. % of a microencapsulated acetamide herbicide on an active ingredient basis.

The liquid pesticidal mixture may optionally, and/or preferably, be further formulated with additives as described elsewhere herein (e.g., a stabilizer, one or more surfactants, an antifreeze, an anti-packing agent, drift control agents, etc.).

The liquid pesticidal mixture containing the dispersion of microcapsules can be formulated to further optimize its shelf stability and safe use. Dispersants, stabilizers, and thickeners are useful to inhibit the agglomeration and settling of the microcapsules. This function is facilitated by the chemical structure of these additives as well as by equalizing the densities of the aqueous and microcapsule phases. Anti-packing agents are useful when the microcapsules are to be redispersed. A pH buffer can be used to maintain the pH of the dispersion in a range which is safe for skin contact and, depending upon the additives selected, in a narrower pH range than may be required for the stability of the dispersion.

Low molecular weight dispersants may solubilize microcapsule shell walls, particularly in the early stages of their formation, causing gelling problems. Thus, in some embodiments dispersants having relatively high molecular weights of at least about 1.5 kg/mole, more preferably of at least about 3 kg/mole, and still more preferably at least about 5, 10 or even 15 kg/mole. In some embodiments, the molecular weight may range from about 3 kg/mole to about 50 kg/mole or from about 5 kg/mole to about 50 kg/mole. Dispersants may also be non-ionic or anionic. An example of a high molecular weight, anionic polymeric dispersant is polymeric naphthalene sulfonate sodium salt, such as Invalon (formerly Irgasol, Huntsman Chemicals). Other useful dispersants and stabilizers include gelatin, casein, ammonium caseinate, polyvinyl alcohol, alkylated polyvinyl pyrrolidone polymers, maleic anhydride-methyl vinyl ether copolymers, styrene-maleic anhydride copolymers, maleic acid-butadiene and diisobutylene copolymers, ethylene oxide-propylene oxide block copolymers, sodium and calcium lignosulfonates, sulfonated naphthalene-formaldehyde condensates, modified starches, and modified cellulosics like hydroxyethyl or hydroxypropyl cellulose, sodium carboxy methyl cellulose, and fumed silica dispersions.

Thickeners are useful in retarding the settling process by increasing the viscosity of the aqueous phase. Shear-thinning thickeners may be preferred, because they act to reduce dispersion viscosity during pumping, which facilitates the economical application and even coverage of the dispersion to an agricultural field using the equipment commonly employed for such purpose. The viscosity of the microcapsule dispersion upon formulation may preferably range from about 100 cps to about 400 cps, as tested with a Haake Rotovisco Viscometer and measured at about 10° C. by a spindle rotating at about 45 rpm. More preferably, the viscosity may range from about 100 cps to about 300 cps. A few examples of useful shear-thinning thickeners include water-soluble, guar- or xanthan-based gums (e.g. Kelzan from CPKelco), cellulose ethers (e.g. ETHOCEL from Dow), modified cellulosics and polymers (e.g. Aqualon thickeners from Hercules), and microcrystalline cellulose anti-packing agents.

Adjusting the density of the aqueous phase to approach the mean weight per volume of the microcapsules also slows down the settling process. In addition to their primary purpose, many additives may increase the density of the aqueous phase. Further increase may be achieved by the addition of sodium chloride, glycol, urea, or other salts. The weight to volume ratio of microcapsules of preferred dimensions is approximated by the density of the core material, where the density of the core material is from about 1.05 to about 1.5 g/cm$^3$. Preferably, the density of the aqueous phase is formulated to within about 0.2 g/cm$^3$ of the mean weight to volume ratio of the microcapsules. More preferably, the density of the aqueous phase ranges from about 0.2 g/cm$^3$ less than the mean weight to volume ratio of the microcapsules to about equal to the mean weight to volume ratio of the microcapsules.

In order to enhance shelf stability and prevent gelling of the aqueous dispersion of microcapsules, particularly upon storage in high temperature environments, the formulated microcapsule dispersions may further include urea or similar structure-breaking agent at a concentration of up to about 20% by weight, typically about 5% by weight.

Surfactants can optionally be included in the compositions of the present invention. Suitable surfactants are selected from non-ionics, cationics, anionics and mixtures thereof. Examples of surfactants suitable for the practice of the present invention include, but are not limited to: alkoxylated tertiary etheramines (such as TOMAH E-Series surfactants); alkoxylated quaternary etheramine (such as TOMAH Q-Series surfactant); alkoxylated etheramine oxides (such as TOMAH AO-Series surfactant); alkoxylated tertiary amine oxides (such as AROMOX series surfactants); alkoxylated tertiary amine surfactants (such as the ETHOMEEN T and C series surfactants); alkoxylated quaternary amines (such as the ETHOQUAD T and C series surfactants); alkyl sulfates, alkyl ether sulfates and alkyl aryl ether sulfates (such as the WITCOLATE series surfactants); alkyl sulfonates, alkyl ether sulfonates and alkyl aryl ether sulfonates (such as the WITCONATE series surfactants); alkoxylated phosphate esters and diesters (such as the PHOSPHOLAN series surfactants); alkyl polysaccharides (such as the AGRIMUL PG series surfactants); alkoxylated alcohols (such as the BRIJ or HETOXOL series surfactants); and mixtures thereof.

Anti-packing agents facilitate redispersion of microcapsules upon agitation of a formulation in which the microcapsules have settled. A microcrystalline cellulose material such as LATTICE from FMC is effective as an anti-packing agent. Other suitable anti-packing agents are, for example, clay, silicon dioxide, insoluble starch particles, and insoluble metal oxides (e.g. aluminum oxide or iron oxide). Anti-packing agents which change the pH of the dispersion are preferably avoided, for at least some embodiments.

Drift control agents suitable for the practice of the present invention are known to those skilled in the art and include the commercial products GARDIAN, GARDIAN PLUS, DRI-GARD, PRO-ONE XL ARRAY, COMPADRE, IN-PLACE, BRONC MAX EDT, EDT CONCENTRATE, COVERAGE and BRONC Plus Dry EDT.

The pH of the formulated microcapsule dispersion may preferably range from about 4 to about 9, in order to minimize eye irritation of those persons who may come into contact with the formulation in the course of handling or application to crops. However, if components of a formulated dispersion are sensitive to pH, such as for example the blocking agent, buffers such as disodium phosphate may be used to hold the pH in a range within which the components are most effective. Additionally, a pH buffer such as citric acid monohydrate may be particularly useful in some systems during the preparation of microcapsules, to maximize the effectiveness of a protective colloid such as SOKALAN CP9.

Other useful additives include, for example, biocides or preservatives (e.g., PROXEL, commercially available from Avecia), antifreeze agents (such as glycerol, sorbitol, or urea), and antifoam agents (such as Antifoam SE23 from Wacker Silicones Corp.).

The compositions described herein can further comprise an additive to control or reduce potential pesticide volatility. Under some application conditions, certain herbicides such as auxin herbicides can, vaporize into the surrounding atmosphere and migrate from the application site to adjacent crop plants, such as soybeans and cotton, where contact damage to sensitive plants can occur. For example, as described in U.S. Application Publication Nos. US 2014/0128264 and US 2015/0264924, which are incorporated herein by reference, additives to control or reduce potential pesticide volatility include monocarboxylic acids, or salts thereof (e.g., acetic acid and/or an agriculturally acceptable salt thereof. Representative monocarboxylic acids and monocarboxylates generally comprise a hydrocarbon or unsubstituted hydrocarbon selected from, for example, unsubstituted or substituted, straight or branched chain alkyl (e.g., $C_1$-$C_{20}$ alkyl such as methyl, ethyl, n-propyl, isopropyl, etc.); unsubstituted or substituted, straight or branched chain alkenyl (e.g., $C_2$-$C_{20}$ alkyl such as ethenyl, n-propenyl, isopropenyl, etc.); unsubstituted or substituted aryl (e.g., phenyl, hydroxyphenyl, etc.); or unsubstituted or substituted arylalkyl (e.g., benzyl). In particular, the monocarboxylic acid can be selected from the group consisting of formic acid, acetic acid, propionic acid, and benzoic acid. The monocarboxylate salt can be selected from the group consisting of formate salts, acetate salts, propionate salts, and benzoate salts. The monocarboxylate salts can include, for example, alkali metal salts selected from sodium and potassium. Preferred monocarboxylate salts include sodium acetate and potassium acetate.

The molar ratio of the pesticide (e.g., auxin herbicide) to the monocarboxylic acid, or monocarboxylate thereof, is typically from about 1:10 to about 10:1, from about 1:5 to about 5:1, from about 3:1 to about 1:3, or from about 2:1 to about 1:2 (e.g., about 1:1).

In various herbicidal concentrate compositions of the present invention, the concentration of monocarboxylic acid and/or salt thereof can be from about 0.25% to about 25%, from about 1% to about 20%, from about 2% to about 15%, from about 2% to about 10%, or from about 5% to about 15% by weight of the concentrate composition.

Release Modulating Agent

In various embodiments, liquid pesticidal mixtures of the present invention also comprise a release modulating agent that modulates the release rate of the microencapsulated pesticide. In general, the release modulating agent comprises a polyvalent metal cation. Typically, the release modulating agent is added to the liquid pesticidal mixture as a water soluble salt or salt solution (e.g., added to the liquid medium, not the core material of the microcapsules). Without being bound by theory, it is believed that the polyvalent metal cations may complex with polyamines in the polyurea shell wall and, as a result, increase the shell wall crosslink density. The increase in shell wall crosslink density is expected to decrease the diffusion coefficient, which results in a slower release rate. Also without being bound by theory, addition of the release modulating agent may alter the solution properties of the pesticidal mixture resulting in slower diffusion of the pesticide from the microcapsules and reducing the overall release rate of the pesticide.

The release modulating agent comprises a polyvalent metal cation. The polyvalent ions can be ions of metals selected the group consisting of magnesium, calcium, aluminum, manganese, iron, copper, zinc, and combinations thereof. In various embodiments, the polyvalent metal cation comprises $Ca^{2+}$.

Generally, the molecular weight of the release modulating agent is relatively small being no greater than about 1000 g/mol, no greater than about 750 g/mol, no greater than about 500 g/mol, no greater than about 300 g/mol, or no greater than about 200 g/mol. The molecular weight of the release modulating agent can be from about 50 g/mol to about 1000 g/mol, from about 50 g/mol to about 750 g/mol, from about 50 g/mol to about 500 g/mol, from about 50 g/mol to about 300 g/mol, from about 50 g/mol to about 200 g/mol, from about 100 g/mol to about 1000 g/mol, from about 100 g/mol to about 750 g/mol, from about 100 g/mol to about 500 g/mol, from about 100 g/mol to about 300 g/mol, or from about 100 g/mol to about 200 g/mol.

The release modulating agent can comprise an organic anion. For example, the release modulating agent can comprise an anion selected from the group consisting of acetate, citrate, carbonate, oxalate and combinations thereof (e.g., calcium acetate). Alternatively, the release modulating agent can comprise an inorganic anion. For example, the release modulating agent can be a salt of a mineral acid such as a halide of salt (e.g., calcium chloride). Also, the release modulating agent can comprise a sulfate anion (e.g., copper sulfate). A mixture of salts can be added to the herbicidal mixture as the release modulating agent. For example, the release modulating agent can comprise a combination of a calcium salt such as calcium chloride or calcium acetate and a copper salt such as copper sulfate.

For a pesticide encapsulated with a polyurea produced using an excess of amine molar equivalents relative to the amount of isocyanate molar equivalents (e.g., at least about 10%, at least about 15%, or at least about 20% excess), it is believed that the polyvalent metal cations complex with polyamines in the polyurea shell wall. Thus, providing a sufficient amount of excess amine is thought to be favorable for complexing with the polyvalent metal cations of the release modulating agent. Accordingly, the ratio of moles of polyvalent metal cation to amine molar equivalents contained in the polyamine component is typically from about 0.05:1 to about 10:1, from about 0.05:1 to about 5:1, from about 0.05:1 to about 3:1, from about 0.05:1 to about 2:1, from about 0.05:1 to about 1.75:1, from about 0.05:1 to about 1.5:1, from about 0.05:1 to about 1:1, from about 0.1:1 to about 10:1, from about 0.1:1 to about 5:1, from about 0.1:1 to about 3:1, from about 0.1:1 to about 2:1, from about 0.1:1 to about 1.75:1, from about 0.1:1 to about 1.5:1, from about 0.1:1 to about 1:1, from about 0.2:1 to about 10:1, from about 0.2:1 to about 5:1, from about 0.2:1 to about 3:1, from about 0.2:1 to about 2:1, from about 0.2:1 to about 1.75:1, from about 0.2:1 to about 1.5:1, from about 0.2:1 to about 1:1, from about 0.3:1 to about 10:1, from about 0.3:1 to about 5:1, from about 0.3:1 to about 3:1, from about 0.3:1 to about 2:1, from about 0.3:1 to about 1.75:1, from about 0.3:1 to about 1.5:1, from about 0.3:1 to about 1:1, from about 0.4:1 to about 10:1, from about 0.4:1 to about 5:1, from about 0.4:1 to about 3:1, from about 0.4:1 to about 2:1, from about 0.4:1 to about 1.75:1, from about 0.4:1 to about 1.5:1, from about 0.4:1 to about 1:1, from about 0.5:1 to about 10:1, from about 0.5:1 to about 5:1, from about 0.5:1 to about 3:1, from about 0.5:1 to about 2:1, from about 0.5:1 to about 1.75:1, from about 0.5:1 to about 1.5:1, or from about 0.5:1 to about 1:1.

The release modulating agent is effective in reducing the release rate of the microencapsulated pesticide (e.g., acetamide herbicide). For example, the addition of the release modulating agent can reduce the release rate of the microencapsulated pesticide over a period of 24 hours following application by at least about 30%, at least about 40%, at least about 50%, at least about 60%, at least about 70%, at least about 80% as compared to a similar pesticidal mixture formulated without the release modulating agent.

In embodiments where the microencapsulated pesticide comprises an acetamide herbicide, the mole ratio of acetamide herbicide to polyvalent metal cation can be from 1:1 to about 100:1, from about 2:1 to about 100:1, from about 2:1 to about 80:1, from about 3:1 to about 80:1, from about 3:1 to about 60:1, from about 3:1 to about 40:1, from about 4:1 to about 100:1, from about 4:1 to about 80:1, from about 4:1 to about 60:1, from about 4:1 to about 40:1, from about 4:1 to about 25:1, from about 5:1 to about 100:1, from about 5:1 to about 80:1, from about 5:1 to about 60:1, from about 5:1 to about 40:1, or from about 5:1 to about 25:1.

In various embodiments where the liquid pesticidal mixture is a concentrate composition comprising a microencapsulated acetamide herbicide, the concentration of the release modulating agent is from about 0.1 wt. % to about 5 wt. %, from about 0.1 wt. % to about 3 wt. %, from about 0.1 wt. % to about 2 wt. %, from about 0.2 wt. % to about 5 wt. %, from about 0.2 wt. % to about 3 wt. %, from about 0.5 wt. % to about 5 wt. %, or about 0.5 wt. % to about 3 wt. %.

In various embodiments, liquid pesticidal mixtures in accordance with the present invention include aqueous herbicidal concentrate compositions comprising:

(a) at least one particulate microencapsulated acetamide herbicide dispersed in an aqueous liquid medium comprising a water-immiscible core material comprising the acetamide herbicide and a polyurea shell wall containing the core material, wherein the acetamide herbicide concentration in the composition on an active ingredient basis is at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % and wherein the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea and wherein the ratio of amine molar equivalents contained in the polyamine component to isocyanate molar equivalents contained in the polyisocyanate component is at least 1.01:1; and (b) a release modulating agent comprising a polyvalent metal cation, wherein the molecular weight of the release modulating agent is no greater than about 1000 g/mol and wherein the ratio of moles of polyvalent metal cation to amine molar equivalents contained in the polyamine component is from about 0.05:1 to about 10:1.

Co-Pesticide

The liquid pesticidal mixtures of the present invention can further comprise a co-pesticide. Typically, the co-pesticide is added to the liquid medium comprising the dispersed microencapsulated pesticide and is dissolved or dispersed therein.

Co-pesticides can comprise co-herbicides, particularly when the microencapsulated pesticide also comprises an herbicide. For example, in various embodiments, the liquid pesticidal mixture is a herbicidal mixture comprising microencapsulated acetamide herbicide. In these and other embodiments, the co-herbicide can be selected from the group consisting of acetyl CoA carboxylase (ACCase) inhibitors, enolpyruvyl shikimate-3-phosphate synthase (EPSPS) inhibitors, glutamine synthetase inhibitors, auxins, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO) inhibitors, cellulose inhibitors, oxidative phosphorylation uncouplers, dihydropteroate synthase inhibitors, fatty acid and lipid biosynthesis inhibitors, auxin transport inhibitors and carotenoid biosynthesis inhibitors, salts and esters thereof, racemic mixtures and resolved isomers thereof, and mixtures thereof.

Where an herbicide is referenced generically herein by name, unless otherwise restricted, that herbicide includes all commercially available forms known in the art such as salts, esters, free acids and free bases, as well as stereoisomers thereof. For example, where the herbicide name "glyphosate" is used, glyphosate acid, salts and esters are within the scope thereof.

EPSPS herbicides include glyphosate or a salt or ester thereof.

Glutamine synthetase herbicides include glufosinate or glufosinate-P, or a salt or and ester thereof.

ACCase inhibitors include, for example, alloxydim, butroxydim, clethodim, cycloxydim, pinoxaden, sethoxydim, tepraloxydim and tralkoxydim, salts and esters thereof, and mixtures thereof. Another group of ACCase inhibitors include chlorazifop, clodinafop, clofop, cyhalofop, diclofop, diclofop-methyl, fenoxaprop, fenthiaprop, fluazifop, haloxyfop, isoxapyrifop, metamifop, propaquizafop, quizalofop and trifop, salts and esters thereof, and mixtures thereof. ACCase inhibitors also include mixtures of one or more "dims" and one or more "fops", salts and esters thereof.

Auxin herbicides (i.e., synthetic auxin herbicides) include, for example, 2,4-dichlorophenoxyacetic acid (2,4-D), 4-(2,4-dichlorophenoxy)butyric acid (2,4-DB), dichloroprop, 2-methyl-4-chlorophenoxyacetic acid (MCPA), 4-(4-chloro-2-methylphenoxy)butanoic acid (MCPB), aminopyralid, clopyralid, fluroxypyr, triclopyr, diclopyr, mecoprop, dicamba, picloram and quinclorac, salts and esters thereof, and mixtures thereof.

PS II inhibitors include, for example, ametryn, amicarbazone, atrazine, bentazon, bromacil, bromoxynil, chlorotoluron, cyanazine, desmedipham, desmetryn, dimefuron, diuron, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, salts and esters thereof, and mixtures thereof.

ALS and AHAS inhibitors include, for example, amidosulfuron, azimsulfruon, bensulfuron-methyl, bispyribac-sodium, chlorimuron-ethyl, chlorsulfuron, cinosulfuron, cloransulam-methyl, cyclosulfamuron, diclosulam, ethametsulfuron-methyl, ethoxysulfuron, flazasulfuron, florazulam, flucarbazone, flucetosulfuron, flumetsulam, flupyrsulfuron-methyl, foramsulfuron, halosulfuron-methyl, imazamethabenz, imazamox, imazapic, imazapyr, imazaquin, imazethapyr, imazosulfuron, iodosulfuron, metsulfuron-methyl, nicosulfuron, penoxsulam, primisulfuron-methyl, propoxycarbazone-sodium, prosulfuron, pyrazosulfuron-ethyl, pyribenzoxim, pyrithiobac, rimsulfuron, sulfometuron-methyl, sulfosulfuron, thiencarbazone, thifensulfuron-methyl, triasulfuron, tribenuron-methyl, trifloxysulfuron and triflusulfuron-methyl, salts and esters thereof, and mixtures thereof.

Mitosis inhibitors include anilofos, benefin, DCPA, dithiopyr, ethalfluralin, flufenacet, mefenacet, oryzalin, pendimethalin, thiazopyr and trifluralin, salts and esters thereof, and mixtures thereof.

PPO inhibitors include, for example, acifluorfen, azafenidin, bifenox, butafenacil, carfentrazone-ethyl, flufenpyrethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, salts and esters thereof, and mixtures thereof.

Carotenoid biosynthesis inhibitors include, for example, aclonifen, amitrole, beflubutamid, benzofenap, clomazone, diflufenican, fluridone, flurochloridone, flurtamone, isoxaflutole, mesotrione, norflurazon, picolinafen, pyrazolynate, pyrazoxyfen, sulcotrione, tembotrione and topramezone, salts and esters thereof, and mixtures thereof.

PS I inhibitors include diquat and paraquat, salts and esters thereof, and mixtures thereof.

Cellulose inhibitors include dichlobenil and isoxaben.

An oxidative phosphorylation uncoupler is dinoterb, and esters thereof.

Auxin transport inhibitors include diflufenzopyr and naptalam, salts and esters thereof, and mixtures thereof.

A dihydropteroate synthase inhibitor is asulam and salts thereof.

Fatty acid and lipid biosynthesis inhibitors include bensulide, butylate, cycloate, EPTC, esprocarb, molinate, pebulate, prosulfocarb, thiobencarb, triallate and vernolate, salts and esters thereof, and mixtures thereof.

Some preferred co-herbicides include flumioxazin, fluometuron, diuron, sulfentrazone, fomesafen, metribuzin, saflufenacil, thiencarbazone, mesotrione, atrazine, isoxaflutole, 2,4-D, dicamba and glyphosate, salts and esters thereof, racemic mixtures and resolved isomers thereof, and mixtures thereof. In some embodiments, the co-herbicide comprises fomesafen and/or a salt of fomesafen such as sodium fomesafen.

Typically, the weight ratio of microencapsulated pesticide to co-pesticide can be from about 1:10 to about 10:1, from about 1:8 to about 8:1, or from about 1:6 to about 6:1. In various embodiments where the microencapsulated pesticide is an acetamide herbicide, the weight of the acetamide herbicide can be greater than the weight of the co-herbicide. In other embodiments, the weight ratio of acetamide herbicide to co-herbicide can be from about 1:30 to about 30:1, from about 1:20 to about 20:1, from about 1:10 to about 10:1, from about 1:8 to about 8:1, from about 1:5 to about 5:1, from about 1:1 to about 30:1, from about 1:1 to about 20:1, from about 1:1 to about 10:1, from about 1:1 to about 8:1, from about 1:1 to about 5:1, from about 1:1 to about 3:1, from about 2:1 to about 30:1, from about 2:1 to about 20:1, from about 2:1 to about 10:1, from about 2:1 to about 8:1, from about 2:1 to about 5:1, from about 2:1 to about 3:1, from about 1:1.5 to about 30:1, from about 1:1.5 to about 20:1, from about 1:1.5 to about 15:1, from about 1:1.5 to about 10:1, from about 1:1.5 to about 8:1, from about 1:1.5 to about 5:1, or from about 1:1.5 to about 3:1.

Some co-pesticides have been found to increase the release rate of microencapsulated pesticides. Nevertheless, incorporation of the release modulating agent in accordance with the present invention controls or reduces the potentially negative impacts to the release rate of the microencapsulated pesticide. Thus, a variety of co-pesticides can be included in the liquid pesticidal mixture without significantly impacting the release rate of the microencapsulated pesticide.

In particular, it has been discovered that certain acidic co-herbicides such as dicamba significantly increase the release rate of encapsulated acetamide herbicides such as acetochlor especially when premixed in a concentrate containing the encapsulated acetamide herbicide. In this case, the increase in release rate of the acetamide herbicide may be excessively injurious to sensitive crops. However, incorporation of the release modulating agent of the present invention significantly reduces or eliminates this problem thereby permitting premixing of the microencapsulated acetamide and the acidic co-herbicide in a concentrate composition.

Accordingly, a liquid herbicidal mixture in accordance with the present invention comprises (a) at least one particulate microencapsulated acetamide herbicide dispersed in an aqueous liquid medium comprising a water-immiscible core material comprising the acetamide herbicide and a polyurea shell wall containing the core material;

(b) a release modulating agent comprising a polyvalent metal cation, wherein the molecular weight of the release modulating agent is no greater than about 1000 g/mol; and (c) an acidic co-herbicide.

Further embodiments of the present invention include aqueous herbicidal concentrate compositions comprising:

(a) at least one particulate microencapsulated acetamide herbicide dispersed in an aqueous liquid medium comprising a water-immiscible core material comprising the acetamide herbicide and a polyurea shell wall containing the core material, wherein the acetamide herbicide concentration in the composition on an active ingredient basis is at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % and wherein the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea and wherein the ratio of amine molar equivalents contained in the polyamine component to isocyanate molar equivalents contained in the polyisocyanate component is at least 1.01:1;

(b) a release modulating agent comprising a polyvalent metal cation, wherein the molecular weight of the release modulating agent is no greater than about 1000 g/mol, and wherein the ratio of moles of polyvalent metal cation to amine molar equivalents contained in the polyamine component is from about 0.05:1 to about 10:1; and (c) an acidic co-herbicide (e.g., a salt of dicamba).

The acidic co-herbicide can comprise an auxin herbicide selected from the group consisting of 2,4-D, 2,4-DB, dichloroprop, MCPA, MCPB, aminopyralid, clopyralid, fluroxypyr, triclopyr, diclopyr, mecoprop, dicamba, picloram and quinclorac, salts and esters thereof, and mixtures thereof. In various embodiments, the acidic co-herbicide comprises a salt of dicamba such as an alkali metal salt or amine salt of dicamba. Specific examples of salts of dicamba include the sodium salt of dicamba, the potassium salt of dicamba, the monoethanolamine salt of dicamba, the diglycolamine salt of dicamba, the dimethylamine salt of dicamba and combinations thereof. In these and other embodiments, the acidic co-herbicide comprises a salt of 2,4-D (e.g., an alkali metal or amine salt). In certain embodiments, the acidic co-herbicide comprises at least one herbicide selected from the group consisting glyphosate, fomesafen, mesotrione, glufosinate, dicamba, salts and esters thereof, and combinations thereof.

In some embodiments, the weight of the acetamide herbicide can be less than the weight of the co-herbicide on an acid equivalence basis. For example, the weight ratio of acetamide herbicide to co-herbicide (acid equivalent basis) can be from about 1:1.5 to about 30:1, from about 1:1.5 to about 20:1, from about 1:1.5 to about 15:1, from about 1:1.5 to about 10:1, from about 1:1.5 to about 8:1, from about 1:1.5 to about 5:1, from about 1:1.5 to about 3:1, from about 1:15 to about 15:1. In various embodiments, the weight of the acetamide herbicide is greater than the weight of the co-herbicide on an acid equivalence basis. For instance, the weight ratio of acetamide herbicide to co-herbicide (acid equivalent basis) can be from about 1:30 to about 30:1, from about 1:20 to about 20:1, from about 1:10 to about 10:1, from about 1:8 to about 8:1, from about 1:5 to about 5:1, from about 1:1 to about 30:1, from about 1:1 to about 20:1, from about 1:1 to about 10:1, from about 1:1 to about 8:1, from about 1:1 to about 5:1, from about 1:1 to about 3:1, from about 2:1 to about 30:1, from about 2:1 to about 20:1, from about 2:1 to about 10:1, from about 2:1 to about 8:1, from about 2:1 to about 5:1, from about 2:1 to about 3:1, from about 1:1.5 to about 30:1, from about 1:1.5 to about 20:1, from about 1:1.5 to about 15:1, from about 1:1.5 to about 10:1, from about 1:1.5 to about 8:1, from about 1:1.5 to about 5:1, or from about 1:1.5 to about 3:1.

Compositions Containing Alkali Metal Salts of an Auxin Co-Herbicide

As noted, it has been found that certain acidic co-herbicides can increase the release rate of the microencapsulated acetamide herbicide, especially when the co-herbicide is premixed in an herbicidal concentrate. In particular, it has been discovered that certain auxin co-herbicides such as dicamba can increase the release rate of microencapsulated acetamide herbicides such as acetochlor. Increasing the release rate of the acetamide herbicide from the microcapsules has the potential to cause injury to sensitive crops.

Surprisingly, it has been discovered that incorporating an alkali metal salt of auxin co-herbicide in an aqueous herbicidal concentrate composition (i.e., premix concentrate) comprising a microencapsulated acetamide herbicide provides for an application mixture (i.e., dilution of the concentrate composition) that exhibits enhanced crop safety upon application. That is, even though the release rate of the acetamide herbicide may increase as a result of the presence of the auxin co-herbicide, use of the alkali metal salt of the auxin co-herbicide nevertheless provides enhanced crop safety as compared to other salts such as amine salts of the auxin herbicide.

In this aqueous herbicidal concentrate composition, at least one particulate microencapsulated acetamide herbicide is dispersed in an aqueous liquid medium. The particulate microencapsulated acetamide herbicide comprises a water-immiscible core material comprising the acetamide herbicide and a polyurea shell wall containing the core material. The salt of the auxin co-herbicide is dissolved in the aqueous liquid. Suitable acetamide herbicides and auxin co-herbicides are noted above. For example, preferred acetamide herbicides include acetochlor, alachlor, metolachlor, S-metolachlor, dimethenamid, dimethenamid-P, butachlor, and combinations. Preferred auxin co-herbicides include 2,4-D, 2,4-DB, dichloroprop, MCPA, MCPB, aminopyralid, clopyralid, fluroxypyr, triclopyr, diclopyr, mecoprop, dicamba, picloram and quinclorac, and mixtures thereof. In various embodiments, the auxin co-herbicide comprises dicamba. In some embodiments, the auxin co-herbicide comprises 2,4-D.

Suitable alkali metal salts of the auxin co-herbicide include agriculturally acceptable alkali metal salts. For example, the alkali metal salts can include sodium and/or potassium. In various embodiments, the alkali metal salt comprises sodium (e.g., sodium dicamba, sodium 2,4-D, etc.). In some embodiments, the alkali metal salt comprises potassium (e.g., potassium dicamba, potassium 2,4-D, etc.).

Generally, the acetamide herbicide concentration in the aqueous herbicidal concentrate composition on an active ingredient basis is at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. %. For example, the concentration of the acetamide herbicide on an active ingredient basis can be from about 10 wt. % to about 65 wt. %, from about 10 wt. % to about 60 wt. %, from about 10 wt. % to about 50 wt. %, from about 10 wt. % to about 40 wt. %, from about 10 wt. % to about 30 wt. %, from about 15 wt. % to about 65 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 65 wt. %, from about 20 wt. % to about 60 wt. %, from about 20 wt. % to about 50 wt. %, from about 20 wt. % to about 40 wt. %, from about 20 wt. % to about 35 wt. %, from about 20 wt. % to about 30 wt. %, from about 25 wt. % to about 65 wt. %, from about 25 wt. % to about 60 wt. %, from about 25 wt. % to about 50 wt. %, from about 25 wt. % to about 40 wt. %, from about 25 wt. % to about 35 wt. %, from about 30 wt. % to about 65 wt. %, from about 30 wt. % to about 60 wt. %, from about 30 wt. % to about 50 wt. %, from about 30 wt. % to about 40 wt. %, or from about 30 wt. % to about 35 wt. %.

Further, the auxin co-herbicide concentration in the composition on an acid equivalent basis is at least about 1 wt. %, at least about 5 wt. %, or at least 10 wt. %. For instance, the auxin co-herbicide concentration in the composition on an acid equivalent basis can be from about 1 wt. % to about 30 wt. %, from about 1 wt. % to about 25 wt. %, from about 1 wt. % to about 20 wt. %, from about 1 wt. % to about 15 wt. %, from about 1 wt. % to about 10 wt. %, from about 5 wt. % to about 30 wt. %, from about 5 wt. % to about 25 wt. %, from about 5 wt. % to about 20 wt. %, from about 5 wt. % to about 15 wt. %, from about 5 wt. % to about 10 wt. %, from about 10 wt. % to about 30 wt. %, from about 10 wt. % to about 25 wt. %, from about 10 wt. % to about 20 wt. %, or from about 10 wt. % to about 15 wt. %.

Also, the weight ratio of acetamide herbicide to auxin herbicide (acid equivalent basis) in the aqueous herbicidal concentrate composition can be from about 1:30 to about 30:1, from about 1:20 to about 20:1, from about 1:10 to about 10:1, from about 1:8 to about 8:1, from about 1:5 to about 5:1, from about 1:1 to about 30:1, from about 1:1 to about 20:1, from about 1:1 to about 10:1, from about 1:1 to about 8:1, from about 1:1 to about 5:1, from about 1:1 to about 3:1, from about 2:1 to about 30:1, from about 2:1 to about 20:1, from about 2:1 to about 10:1, from about 2:1 to about 8:1, from about 2:1 to about 5:1, from about 2:1 to about 3:1, from about 1:1.5 to about 30:1, from about 1:1.5 to about 20:1, from about 1:1.5 to about 15:1, from about 1:1.5 to about 10:1, from about 1:1.5 to about 8:1, from about 1:1.5 to about 5:1, from about 1:1.5 to about 3:1, from about 1:15 to about 15:1, from about 1:10 to about 10:1, from about 1:8 to about 8:1, from about 1:5 to about 5:1, from about 1:1 to about 20:1, from about 1:1 to about 15:1, from about 1:1 to about 10:1, from about 1:1 to about 8:1, from about 1:1 to about 5:1, or from about 1:1 to about 3:1.

The aqueous herbicidal concentrate composition can include other features as described herein. For example, the aqueous herbicidal concentrate composition can include various features described above with respect to microencapsulation, the liquid pesticidal mixtures, and release modulating agent.

As noted, the aqueous herbicidal concentrate composition can include additional co-herbicides (i.e., one or more co-herbicides in addition to the auxin co-herbicide and acetamide herbicide) as mentioned herein also typically dissolved or dispersed in the liquid medium comprising the dispersed microencapsulated acetamide herbicide. Exemplary classes of additional co-herbicides include photosystem II inhibitors, ACCase inhibitors, acetolactate synthase or acetohydroxy acid synthase inhibitor, PPO inhibitors, carotenoid biosynthesis inhibitors, among others. Specific examples of preferred additional co-herbicides include glyphosate, glufosinate, flumioxazin, fomesafen, lactofen, sulfentrazone, oxyfluorfen, saflufenacil, metribuzin, thiencarbazone, mesotrione, atrazine, flumetsulam, isoxaflutole, and fluometuron, salts and esters thereof, racemic mixtures and resolved isomers thereof, and mixtures thereof. In some embodiments, the additional co-herbicide comprises fomesafen and/or a salt of fomesafen such as sodium fomesafen. In certain embodiments, the additional co-herbicide comprises metribuzin. In other embodiments, the liquid pesticidal mixtures include a three-way combination of microencapsulated acetochlor, sodium dicamba and fomesafen and/or a salt of fomesafen such as sodium fomesafen or metribuzin.

Application Mixtures

The liquid pesticidal mixtures (e.g., aqueous herbicidal concentrate compositions) can be diluted with water as needed to form application mixtures. For example, when the microencapsulated pesticide comprises an acetamide herbicide, then the liquid pesticidal mixtures are useful as controlled-release herbicides. Therefore, the present invention is also directed to a method of applying an application mixture, which is a dilution of the concentrate composition, for controlling plant growth. The acetamide herbicide loading in the application mixture is typically no more than about 5% by weight or from about 0.1% to about 5% by weight on an active ingredient basis, such as 5%, 4%, 3%, 2%, 1%, 0.5% or 0.1% by weight on an active ingredient basis.

The application mixture may be applied to a field according to practices known to those skilled in the art. In some embodiments, the application mixture is applied to the soil, before planting the crop plants or after planting, but pre-emergent to the crop plants. Because the release characteristics of encapsulated acetamide herbicide particles are adjustable, the timing of release initiation (or increase release) can be controlled thereby giving both commercially acceptable weed control and a commercially acceptable rate of crop injury.

The effective amount of encapsulated acetamide herbicide and optional co-herbicide to be applied to an agricultural field is dependent upon the identity of the herbicides, the release rate of the capsules or microcapsules, the crop to be treated, and environmental conditions, especially soil type and moisture. Generally, application rates of acetamide herbicides, such as, for example, acetochlor, are on the order of about 0.1, 0.5, 1, 2, 3, 4, 5, 6, 7, 8, 9 or 10 kilograms of herbicide per hectare, or ranges thereof, such as from 0.5 to 10 kilograms per hectare, from 0.5 to 10 kilograms per hectare, from 0.5 to 5 kilograms per hectare, or from 1 to 5 kilograms per hectare. In some embodiments, an application rate for sorghum, rice and wheat of from about 0.85 to about 1 kilograms per hectare is preferred.

Generally, application rates of optional co-herbicides herbicides, such as, for example, dicamba, are on the order of about 0.05, 0.1, 0.5, 1, 1.5, 2, 2.5, 3, 4 or 5 kilograms of herbicide per hectare, or ranges thereof, such as from 0.1 to 5 kilograms per hectare, from 0.5 to 2.5 kilograms per hectare, or from 0.5 to 2 kilograms per hectare.

Application mixtures of the aqueous herbicidal concentrates are preferably applied to an agricultural field within a selected timeframe of crop plant development. In various embodiments of the present invention, the application mixture prepared from an aqueous herbicidal concentrate is applied post-emergence to crop plants. For purposes of the present invention, post-emergence to crop plants includes initial emergence from the soil, i.e., "at cracking". In some embodiments, the application mixture is applied to a field from 1-40 days prior to planting of the crop plant and/or preemergence (i.e., from planting of the crop plant up to, but not including, emergence or cracking) in order to provide control of newly emerging monocots and small seeded dicot species without significant crop damage. In various embodiments, the application mixture prepared from an aqueous herbicidal concentrate of the present invention is applied pre-emergence to weeds.

Application mixtures of the aqueous herbicidal concentrates of the present invention are useful for controlling a wide variety of weeds, i.e., plants that are considered to be a nuisance or a competitor of commercially important crop plants, such as corn, soybean, cotton, dry beans, snap beans, and potatoes etc. In some embodiments, the application mixtures are applied before the weeds emerge (i.e., preemergence application). Examples of weeds that may be controlled according to the method of the present invention include, but are not limited to, Meadow Foxtail (*Alopecurus pratensis*) and other weed species with the *Alopecurus* genus, Common Barnyard Grass (*Echinochloa crus-galli*) and other weed species within the *Echinochloa* genus, crabgrasses within the genus *Digitaria*, White Clover (*Trifolium repens*), Lambsquarters (*Chenopodium berlandieri*), Redroot Pigweed (*Amaranthus retrollexus*) and other weed species within the *Amaranthus* genus, Common Purslane (*Portulaca oleracea*) and other weed species in the *Portulaca* genus, *Chenopodium album* and other *Chenopodium* spp., *Setaria lutescens* and other *Setaria* spp., *Solanum nigrum* and other *Solanum* spp., *Lolium multiflorum* and other *Lolium* spp., *Brachiaria platyphylla* and other *Brachiaria* spp., *Sorghum halepense* and other *Sorghum* spp., *Conyza Canadensis* and other *Conyza* spp., and *Eleusine indica*. In some embodiments, the weeds comprise one or more glyphosate-resistant species, 2,4-D-resistant species, dicamba-resistant species and/or ALS inhibitor herbicide-resistant species. In some embodiments, the glyphosate-resistant weed species is selected from the group consisting of Amaranthus palmeri, Amaranthus rudis, Ambrosia artemisiifolia, Ambrosia trifida, Conyza bonariensis, Conyza canadensis, Digitaria insularis, Echinochloa colona, Eleusine indica, Euphorbia heterophylla, Lolium multiflorum, Lolium rigidum, Plantago lancelata, Sorghum halepense, and Urochloa panicoides.

Certain crop plants such as soybean, cotton and corn are less susceptible to the action of acetamide herbicides and other co-herbicides such as dicamba than are weeds. In accordance with the present invention and based on experimental evidence to date, it is believed that the controlled acetamide release rate from the encapsulated acetamide herbicides in combination with crop plants having reduced acetamide susceptibility enables commercial control of weeds and commercially acceptable rates of crop damage when encapsulated acetamide herbicides are applied to a field either pre-planting or preemergent to the crop plant. This enables the use of seedling growth inhibitor acetamide herbicides, or optionally seedling growth inhibitor acetamide herbicides in combination with a co-herbicide such as dicamba in crop plant pre-planting and preemergence applications.

In some embodiments of the present invention, crop plants include, for example, corn, soybean, cotton, dry beans, snap beans, and potatoes. Crop plants include hybrids, inbreds, and transgenic or genetically modified plants having specific traits or combinations of traits including, without limitation, herbicide tolerance (e.g., resistance to glyphosate, glufosinate, dicamba, sethoxydim, PPO inhibitor, etc.), Bacillus thuringiensis (Bt), high oil, high lysine, high starch, nutritional density, and drought resistance. In some embodiments, the crop plants are tolerant to organophosphorus herbicides, acetolactate synthase (ALS) or acetohydroxy acid synthase (AHAS) inhibitor herbicides, auxin herbicides and/or acetyl CoA carboxylase (ACCase) inhibitor herbicides, In other embodiments the crop plants are tolerant to glyphosate, dicamba, 2,4-D, MCPA, quizalofop, glufosinate and/or diclofop-methyl. In other embodiments, the crop plant is glyphosate and/or dicamba tolerant. In some embodiments of the present invention, crop plants are glyphosate and/or glufosinate tolerant. In some other embodiments, the crop plants are glyphosate, glufosinate and dicamba tolerant. In these and other embodiments, the crop plants are tolerant to PPO inhibitors.

Particularly preferred crop species are corn, cotton and soybean. In embodiments where the crop is corn, it is preferred to apply the application mixture at planting to before crop emergence, before planting of the crop (e.g., 1-4 weeks before planting crop), and/or after the crop has emerged. In embodiments where the crop is cotton, it is preferred to apply the application mixture at planting to before crop emergence, before planting of the crop (e.g., 1-4 weeks before planting crop), and/or after the crop has emerged (e.g., using a shielded sprayer to keep application mixture off of the crop). In embodiments where the crop is soybean, it is preferred to apply the application mixture at planting to before crop emergence, before planting of the crop (e.g., 1-4 weeks before planting crop), and/or after the crop has emerged.

Having described the invention in detail, it will be apparent that modifications and variations are possible without departing from the scope of the invention defined in the appended claims.

EXAMPLES

The following non-limiting examples are provided to further illustrate the present invention.

Example 1

An aqueous herbicidal concentrate composition was prepared according to the protocol described in this example.

A dispersion of microencapsulated acetochlor was prepared as follows. The internal phase was prepared with the components and amounts shown in Table 1-1. The percentages indicate the approximate weight percentage of each component in the final aqueous herbicide concentrate composition.

TABLE 1-1

Internal Phase Components

| Ingredient | component wt. % active | wt. % in final concentrate composition | wt. % active in final concentrate composition |
|---|---|---|---|
| Acetochlor | 96.0 | 44.79 | 43.0 |
| ISOPAR M (solvent, $C_{11}$-$C_{16}$ isoalkanes) | 100 | 2.32 | 2.32 |
| DESMODUR N 3215 (aliphatic isocyanate based on hexamethylene diisocyanate) | 100 | 3.26 | 3.26 |

To prepare the internal phase of the acetochlor microcapsules, acetochlor was charged to the mixing vessel. Next, the solvent ISOPAR M was charged to the mixing vessel, followed by the DESMODUR N 3215 polyisocyanates. The solution was agitated to obtain a clear homogenous solution. The solution may be sealed within the mixing vessel and stored until needed. Prior to use, the mixture was heated to 50° C. in an oven.

The external aqueous phase was prepared containing the components and amounts shown in Table 1-2.

TABLE 1-2

External Phase Components

| Ingredient | wt. % active | wt. % in final concentrate composition | wt. % active in final concentrate composition |
|---|---|---|---|
| Glycerin | 100 | 8.41 | 8.41 |
| SOKALAN CP9 (maleic acid-olefin copolymer) | 25 | 2.56 | 0.64 |
| Ammonium Caseinate | 100 | 0.05 | 0.05 |
| Citric Acid | 50 | 0.15 | 0.05 |
| Urea | 50 | 5.0 | 2.5 |
| Water | 100 | 33.41 | 33.41 |
| Triethylenetetramine (TETA) | 50 | 1.655 | 0.83 |

To prepare the external phase, a mixing vessel was charged with water and the remaining external phase component other than TETA. The solution was agitated to obtain a clear homogenous solution. The solution may be sealed within the mixing vessel and stored until needed. Prior to use, the mixture was heated to 50° C. in an oven.

The interfacial polymerization medium was prepared by first charging the external phase (without TETA) to a Waring blender cup that has been preheated to 50° C. The commercial Waring blender (Waring Products Division, Dynamics Corporation of America, New Hartford, Conn., Blender 700) was powered through a 0 to 120 volt variable autotransformer. The blender mix speed was varied by controlling power to the blender. The internal phase was added to the external phase over a 16 second interval and blending was continued to obtain an emulsion.

To initiate polymerization and encapsulation of the internal phase, TETA was added to the emulsion over a period of about 5 seconds. The blender speed is then reduced to a speed which just produces a vortex for approximately five to fifteen minutes. The emulsion was then transferred to a hot plate and stirred. The reaction vessel is covered and maintained at about 50° C. for approximately two hours which has been found is sufficient time for the isocyanate to react essentially completely.

The capsule slurry is then allowed to cool to close to room temperature. The microcapsules of acetochlor were then mixed with a stabilizer having the ingredients listed below in Table 1-3 to form an aqueous dispersion of acetochlor microcapsules. The components shown in Table 1-3 with the exception of the buffer are previously premixed with a high speed mixer (Waring Blender or Cowles Dissolver). The resulting stabilizer premix is then added to the capsule slurry to stabilize the dispersion of microcapsules. Finally the buffer is added and the mixture is stirred for at least 15 minutes until visually homogeneous.

TABLE 1-3

Stabilizer Components

| Ingredient | wt. % active | wt. % in concentrate composition | wt. % active in concentrate composition |
|---|---|---|---|
| KELZAN CC (xanthan gum) | 100 | 0.06 | 0.06 |
| Urea | 50 | 5 | 2.5 |
| INVALON DAM (naphthalene sulfonate condensate) | 40 | 6.76 | 2.70 |
| AGNIQUE DFM-111S (silicone based defoamer) | 100 | 0.001 | 0.001 |
| PROXEL GXL (solution of 1,2-benzisothiazolin-3-one | 100 | 0.06 | 0.06 |
| Caustic (NaOH) | 20 | 0.02 | 0.004 |
| Disodium phosphate | 100 | 0.201 | 0.201 |

This dispersion of acetochlor microcapsules was prepared to have an excess of amine molar equivalents to isocyanate molar equivalents and herbicide to shell wall component ratios. TETA has an approximate equivalent weight of 36.6 g/mol. DESMODUR N3215 has an approximate equivalent weight of 181 g/mol. The mean particle size of the acetochlor microcapsules was approximately 10 microns. The final microencapsulated acetochlor composition is presented in Table 1-4. This composition is representative of WARRANT, a microencapsulated acetochlor concentrate available from Monsanto Co., St. Louis, Mo.

TABLE 1-4

Final Microencapsulated Acetochlor Composition 1

| Ingredient | wt. % active | wt. % in concentrate composition | wt. % active in concentrate composition |
|---|---|---|---|
| Acetochlor | 96.0 | 44.79 | 43.0 |
| ISOPAR M (solvent, $C_{11}$-$C_{16}$ isoalkanes) | 100 | 2.32 | 2.32 |
| DESMODUR N 3215 (aliphatic isocyanate based on hexamethylene diisocyanate) | 100 | 3.26 | 3.26 |
| Glycerin | 100 | 8.41 | 8.41 |
| SOKALAN CP9 | 25 | 2.56 | 0.64 |
| Ammonium Caseinate | 100 | 0.05 | 0.05 |
| Citric Acid | 50 | 0.15 | 0.05 |
| Urea | 50 | 10.0 | 5.0 |
| Water | 100 | 33.41 | 33.41 |
| triethylenetetramine (TETA) | 50 | 1.655 | 0.83 |
| KELZAN CC (xanthan gum) | 100 | 0.06 | 0.06 |
| INVALON DAM (naphthalene sulfonate condensate) | 40 | 6.76 | 2.70 |
| AGNIQUE DFM-111S (silicone based defoamer) | 100 | 0.001 | 0.001 |
| PROXEL GXL (solution of 1,2-benzisothiazolin-3-one | 100 | 0.06 | 0.06 |
| Caustic | 20 | 0.02 | 0.004 |
| Disodium phosphate | 100 | 0.201 | 0.201 |

Example 2

A series of herbicidal premix concentrates containing microencapsulated acetochlor and selected dicamba salts were prepared. Dicamba salt concentrates were prepared by mixing water with the respective dicamba salt. As referred to herein, the salts of dicamba are as follows DGA=diglycolamine salt; MEA=monoethanolamine salt; Na=sodium salt; and K=potassium salt.

To prepare the premix concentrates, the microencapsulated acetochlor composition prepared in accordance with Example 1 and the dicamba salt concentrates were mixed to the concentrations shown in Table 2-1. Water was added as needed to adjust the concentration of each herbicide.

For the purposes of estimating the potential for crop injury of the microencapsulated acetochlor, the acetochlor release rate profile was measured in the laboratory using a SOTAX AT-7 (SOTAX Corporation; Horsham, Pa. 19044) agitated dissolution test apparatus. An aqueous slurry containing 1% by weight of the microencapsulated acetochlor herbicide active ingredient was prepared by combining the premix concentrate compositions with deionized water and mixing at 150 RPM and 25° C. An aliquot of each solution was sampled at 24 hours. Each aliquot was filtered through a syringe filter (TARGET Cellulose Acetate 0.2 µm, ThermoFisher Scientific) to remove any capsules. The resulting solution was then analyzed for acetochlor by HPLC. The results of the release rate tests are presented in Table 2-1. A microencapsulated acetochlor composition prepared in accordance with Example 1 was used as the control.

TABLE 2-1

Release Rate from Solutions Prepared from Premix Concentrates
Containing Acetochlor and Dicamba

| Formulation No. | Acetochlor (% a.i.) | Dicamba (% a.e.) | Dicamba salt | 24-hour Acetochlor release rate (ppm) |
|---|---|---|---|---|
| Control (WARRANT) | 33.0 | 0 | — | 108.6, 176.1 |
| 110-B-1 | 26.24 | 11.7 | DGA | 300.4 |
| 110-B-2 | 26.61 | 11.8 | MEA | 303.5 |
| 110-B-3 | 23.01 | 10.2 | Na | 226.2 |
| 110-B-4 | 25.02 | 11.1 | K | 251.4 |

These results show that the release rate of acetochlor increases by as much as about three-fold when the solution is prepared from premix concentrates containing microencapsulated acetochlor and various dicamba salts. The results also show that the release rate of acetochlor is unexpectedly affected by the type of dicamba salt used. When a alkali metal salt (sodium or potassium) of dicamba was used, the release rate of acetochlor increased relative to the control, but to a significantly lesser degree as compared to the release rates when an amine salt of dicamba was used.

Additional premix concentrates were prepared in the same manner, except that a release modulating agent comprising a polyvalent metal salt (calcium chloride, calcium acetate, or copper sulfate) was first added to the microencapsulated acetochlor composition before mixing with the dicamba salt concentrate. A representative procedure for preparing the premix concentrates of microencapsulated acetochlor, dicamba, and release modulating agent is described below.

In a beaker, 61.40 g of 43% microencapsulated acetochlor prepared in accordance with Example 1 was poured into a 200 ml volume beaker. Then a portion of polyvalent metal salt (e.g., 0.94 g calcium chloride) was slowly added into the beaker while the suspension is continuously mixed using a magnet stirrer. The suspension was mixed for at least 30 minutes to make sure the added polyvalent metal salt (e.g., calcium chloride) was thoroughly dissolved. Then, a portion of the dicamba salt concentrate (e.g., 30.39 g DGA dicamba (38.5% a.e.)) was added into the beaker followed by water (e.g., 7.27 g). The mixture was mixed for another 10 min.

The release rate test described above was repeated. The results are provided in Table 2-2. The results show that the addition of a polyvalent metal salt to the pre-mix concentrates significantly reduced the acetochlor release rate. Use of calcium (e.g., calcium chloride) was effective in reducing the acetochlor release rate by as much as four-fold.

TABLE 2-2

Release Rate from Solutions Prepared from Premix Concentrates
Containing Acetochlor, Dicamba, and Polyvalent Metal Salt

| Formulation No. | Acetochlor (% a.i.) | Dicamba (% a.e.) | Dicamba salt | Polyvalent Metal Salt | Polyvalent Metal Salt (wt. %) | 24-hour Acetochlor release rate (ppm) |
|---|---|---|---|---|---|---|
| 110-B-5 | 22.04 | 9.8 | DGA | CaCl$_2$ | 1.18 | 118.8 |
| 110-B-6 | 24.87 | 11.1 | MEA | CaCl$_2$ | 1.33 | 98.6 |
| 110-B-7 | 21.75 | 9.7 | Na | CaCl$_2$ | 1.16 | 75.0 |
| 110-B-8 | 23.79 | 10.6 | K | CaCl$_2$ | 1.27 | 77.6 |
| 576-A-1 | 25.18 | 11.19 | DGA | CaCl$_2$ | 1.2 | 109.5 |
| 576-A-4 | 25.3 | 11.24 | DGA | CaCl$_2$ | 1.05 | 118.4 |

TABLE 2-2-continued

Release Rate from Solutions Prepared from Premix Concentrates
Containing Acetochlor, Dicamba, and Polyvalent Metal Salt

| Formulation No. | Acetochlor (% a.i.) | Dicamba (% a.e.) | Dicamba salt | Polyvalent Metal Salt | Polyvalent Metal Salt (wt. %) | 24-hour Acetochlor release rate (ppm) |
|---|---|---|---|---|---|---|
| 126-A-3 | 25.87 | 11.5 | DGA | Calcium acetate | 1.38 | 128.3 |
| 126-A-7 | 25.95 | 11.53 | DGA | Calcium acetate | 1.73 | 110.3 |
| 126-A-1 | 25.72 | 11.43 | DGA | Calcium acetate | 2.29 | 97.3 |
| 110-B-9 | 21.97 | 9.8 | DGA | CuSO$_4$ | 1.66 | 197.1 |
| 110-B-10 | 19.55 | 8.7 | Na | CuSO$_4$ | 1.48 | 136.2 |

Example 3

A series of herbicidal premix concentrates containing microencapsulated acetochlor and sodium dicamba salt were prepared by mixing a microencapsulated acetochlor composition prepared in accordance with Example 1 with sodium dicamba to the concentrations specified in Table 3-1. Calcium chloride was also added to the herbicidal concentrates in varying amounts as a release modulating agent prior to mixing with sodium dicamba. The release rate test described in Example 2 was repeated for these concentrates. These results are also provided in Table 3-1.

TABLE 3-1

Samples for Detecting the Association of Acetochlor Release
Rate with Calcium Ion Content in the Premix Concentrates

| Formulation No. | Acetochlor (% a.i.) | Na Dicamba (% a.e.) | CaCl$_2$ (wt. %) | Ca$^{2+}$/Acetochlor (w/w) | Amine Molar Equivalents/Moles of Ca$^{2+}$ | 24-hour Acetochlor release rate (ppm) |
|---|---|---|---|---|---|---|
| 260-B-6 | 24.7 | 30.1 | 0.00 | 0 | — | 231.3 |
| 260-B-1 | 24.6 | 28.48 | 0.12 | 0.0018 | 11.97 | 230.2 |
| 260-B-2 | 24.6 | 27.36 | 0.25 | 0.0037 | 5.75 | 226.8 |
| 260-B-3 | 24.4 | 28.85 | 0.52 | 0.0077 | 2.74 | 209.9 |
| 260-B-4 | 24.3 | 27.6 | 0.74 | 0.011 | 1.92 | 151.2 |
| 260-B-5 | 24.4 | 31.88 | 1.15 | 0.017 | 1.24 | 126.8 |

Example 4

A series of herbicidal premix concentrates containing microencapsulated acetochlor and selected dicamba salts were prepared by mixing a microencapsulated acetochlor composition prepared in accordance with Example 1 with dicamba salts to the concentrations specified in Tables 4-1 and 4-2. One or more polyvalent metal salts (calcium chloride, calcium acetate, or copper sulfate) were added to each concentrate during preparation as release modulating agents. Also, sodium acetate alone or in combination with EDTA was added to selected concentrates. The release rate test described in Example 2 was repeated for these concentrates. These results are also provided in Tables 4-1 and 4-2. Microencapsulated acetochlor compositions prepared in accordance with Example 1 were used as the controls.

TABLE 4-1

24-hour

| Formulation No. | Acetochlor (% a.i.) | Dicamba (% a.e.) | Dicamba salt | CaCl$_2$ (wt. %) | CuSO$_4$ (wt. %) | Sodium Acetate (wt. %) | EDTA (wt. %) | Acetochlor release rate (ppm) |
|---|---|---|---|---|---|---|---|---|
| Control 1 | 33 | 0 | — | — | — | — | — | 124 |
| Control 2 | 36 | 0 | — | — | — | — | — | 116 |
| Control 3 | 43 | 0 | — | — | — | — | — | 118 |
| 110-C-5 | 26.4 | 11.7 | DGA | 2.4 | 0 | 2.2 | 0 | 140.0 |
| 110-C-6 | 26.4 | 11.8 | DGA | 2.4 | 0 | 3.5 | 0 | 141.2 |
| 110-C-9 | 26.4 | 11.8 | DGA | 1.8 | 0 | 0 | 0 | 203.9 |
| 110-C-10 | 26.4 | 11.8 | DGA | 1.8 | 0 | 2.2 | 0 | 203.3 |
| 110-C-11 | 26.4 | 11.7 | DGA | 1.8 | 0 | 4.4 | 0 | 203.9 |
| 110-C-12 | 26.4 | 11.8 | DGA | 3.0 | 0 | 2.2 | 0.5 | 179.9 |
| 110-C-13 | 26.4 | 11.7 | DGA | 2.4 | 0 | 2.2 | 0.5 | 135.1 |
| 110-C-14 | 26.4 | 11.7 | DGA | 1.8 | 0 | 2.2 | 0.5 | 240.1 |
| 110-D-1 | 26.4 | 11.7 | DGA | 3.0 | 0 | 0 | 0 | 110.8 |
| 110-D-2 | 26.4 | 11.7 | DGA | 2.4 | 0 | 2.2 | 0 | 123.1 |
| 110-D-3 | 26.4 | 11.7 | DGA | 2.4 | 0 | 2.2 | 0.5 | 133.0 |
| 110-D-4 | 26.4 | 11.7 | DGA | 2.4 | 0 | 4.4 | 0 | 115.7 |
| 110-D-5 | 26.4 | 11.7 | DGA | 2.4 | 0 | 4.4 | 0.5 | 131.0 |
| 110-D-6 | 26.4 | 11.9 | DGA | 3.0 | 0 | 4.4 | 0 | 103.2 |
| 110-D-7 | 26.4 | 11.9 | DGA | 3.0 | 0 | 2.2 | 0.5 | 112.7 |
| 110-D-8 | 26.4 | 11.9 | DGA | 1.8 | 0 | 4.4 | 0 | 128.2 |
| 110-D-9 | 26.4 | 11.9 | DGA | 1.8 | 0 | 2.2 | 0.5 | 157 |
| 110-E-1 | 26.4 | 11.7 | Na | 0.9 | 0.3 | 0 | 0 | 84.10 |
| 110-E-2 | 26.4 | 11.8 | Na | 0.9 | 0 | 0 | 0 | 84.02 |
| 110-E-3 | 26.4 | 11.7 | Na | 0.9 | 0 | 2.2 | 0 | 85.94 |
| 110-E-4 | 26.4 | 11.8 | Na | 0.7 | 0 | 0 | 0 | 89.83 |
| 110-E-5 | 26.4 | 11.8 | DGA | 3.0 | 0 | 4.4 | 0.5 | 125.9 |
| 110-E-6 | 26.4 | 11.7 | DGA | 2.4 | 0 | 4.4 | 1.0 | 118.6 |

TABLE 4-2

| Formulation No. | Acetochlor (% a.i.) | Dicamba (% a.e.) | Dicamba salt | Calcium acetate (wt. %) | CuSO$_4$ (wt. %) | Sodium Acetate (wt. %) | EDTA (wt. %) | 24-hour Acetochlor release rate (ppm) |
|---|---|---|---|---|---|---|---|---|
| Control 1 | 33 | 0 | — | — | — | — | — | 124 |
| Control 3 | 43 | 0 | — | — | — | — | — | 116 |
| 758-A-2 | 25.7 | 10.3 | MEA | 2.1 | 0 | 0 | 0 | 125 |
| 758-A-4 | 24.8 | 10.0 | MEA | 1.0 | 0.25 | 0 | 0 | 139 |
| 758-L-5 | 24.0 | 9.7 | MEA | 1.0 | 0.39 | 2.99 | 0 | 133 |
| 758-L-6 | 24.1 | 9.7 | MEA | 1.0 | 0.39 | 3.00 | 1.07 | 141 |
| 471-N-2 | 21.8 | 8.8 | Na | 0.9 | 0.44 | 0 | 0 | 106 |
| 758-J-9 | 25.7 | 10.3 | Na | 1.0 | 0.26 | 0 | 0 | 102 |
| 758-M-7 | 25.9 | 10.4 | Na | 1.0 | 0.00 | 3.22 | 0 | 125 |
| 758-M-9 | 24.6 | 9.9 | Na | 1.0 | 0.25 | 3.06 | 0 | 97 |
| 758-M-11 | 24.6 | 9.9 | Na | 1.0 | 0.25 | 3.06 | 1.1 | 119 |

Example 5

A series of herbicidal premix concentrates containing microencapsulated acetochlor and selected dicamba salts were prepared by mixing a microencapsulated acetochlor composition prepared in accordance with Example 1 with dicamba salts to the concentrations specified in Table 5-1. One or more polyvalent metal salts (calcium acetate or copper sulfate) were added to each concentrate during preparation as a release modulating agent. Also, sodium acetate alone or in combination with EDTA was added to selected concentrates. The release rate test described in Example 2 was repeated for these concentrates. These results are also provided in Table 5-1.

TABLE 5-1

| Formulation No. | Acetochlor (% a.i.) | Dicamba (% a.e.) | Dicamba salt | Calcium acetate (wt. %) | CuSO$_4$ (wt. %) | Sodium Acetate (wt. %) | EDTA (wt. %) | 24-hour Acetochlor release rate (ppm) |
|---|---|---|---|---|---|---|---|---|
| 758-A-5 | 24.06 | 10.70 | MEA | 1.07 | 0.54 | 0 | 0 | 124 |
| 758-L-2 | 24.90 | 11.18 | MEA | 1.32 | 0 | 2.88 | 0 | 136 |
| 758-L-4 | 24.34 | 10.82 | MEA | 1.29 | 0.27 | 2.83 | 0 | 118 |
| 758-P-2 | 24.32 | 10.79 | MEA | 1.3 | 0.27 | 2.81 | 0.44 | 122 |
| 758-P-12 | 22.44 | 10.02 | Na | 0.99 | 0 | 0.9 | 0.6 | 114 |
| 758-P-9 | 22.19 | 9.87 | Na | 0.98 | 0.25 | 0.89 | 0.6 | 107 |
| 758-J-10 | 24.88 | 11.06 | Na | 1.1 | 0.27 | 0.93 | 0 | 100 |
| 758-J-11 | 25.00 | 11.18 | Na | 1.11 | 0.28 | 0.99 | 1.18 | 114 |

Example 6

A series of herbicidal premix concentrates containing microencapsulated acetochlor and selected dicamba salts were prepared by mixing a microencapsulated acetochlor composition prepared in accordance with Example 1 with dicamba salts to the concentrations specified in Table 6-1. A polyvalent metal salt (calcium chloride) was added to each concentrate during preparation as release modulating agents. The release rate test described in Example 2 was repeated for these concentrates. These results are also provided in Table 6-1. A microencapsulated acetochlor composition prepared in accordance with Example 1 was used as the control.

TABLE 6-1

| Formulation No. | Acetochlor (% a.i.) | Dicamba (% a.e.) | Dicamba salt | Calcium chloride (wt. %) | 24-hour Acetochlor release rate (ppm) |
|---|---|---|---|---|---|
| Control | 34 | — | — | — | 104 |
| 260-A-1 | 26.4 | 11.7 | DGA | — | 317 |
| 260-A-2 | 26.4 | 11.7 | Na | — | 252 |
| 110-L-2 | 26.4 | 11.7 | DGA | 0.94 | 147 |
| 110-P-9 | 26.4 | 11.7 | Na | 0.94 | 110 |

Application mixtures were prepared from these concentrates and applied to soybeans and cotton to determine crop injury utilizing the following procedure.

Spray solutions were diluted to appropriate application rates using the Packard MultiProbe 204DT. Each treatment was replicated 4 times. Applications of the herbicide mixtures were made using a flat even nozzle TJET 9501 with pressure set at 24 psi (165 kPa). The spray nozzle was approximately 16 inches above top of plant material. Each application was made at a spray volume of 10 gallons per acre (GPA).

Treatments were made when plants reach the desired size, height or leaf stage. For crop safety studies, soybeans were treated between the 2-3 leaf stage and plants were approximately 15-20 cm high, cotton was treated between the 3-4 leaf stage and plants were approximately 20-30 cm high. For weed efficacy treatments ABUTH plants were treated at the 5-6 leaf stage. Crop safety application rates were chosen to mimic real world scenarios of 1× treatments and 2× or over-lap conditions. Weed efficacy application rates were chosen to achieve percent control ratings in the range of 50% at the lowest rate to 90% control at the highest rate. The rates in this control range provide the best possible efficacy comparisons among formulations, allowing separation of relative performance of test samples. The rate structure used for a given test is dependent on the environmental conditions at the time of spray application (time of year), the plant species being treated (highly susceptible or tough to kill) and age (or size) of plants to be treated.

Figure 2:
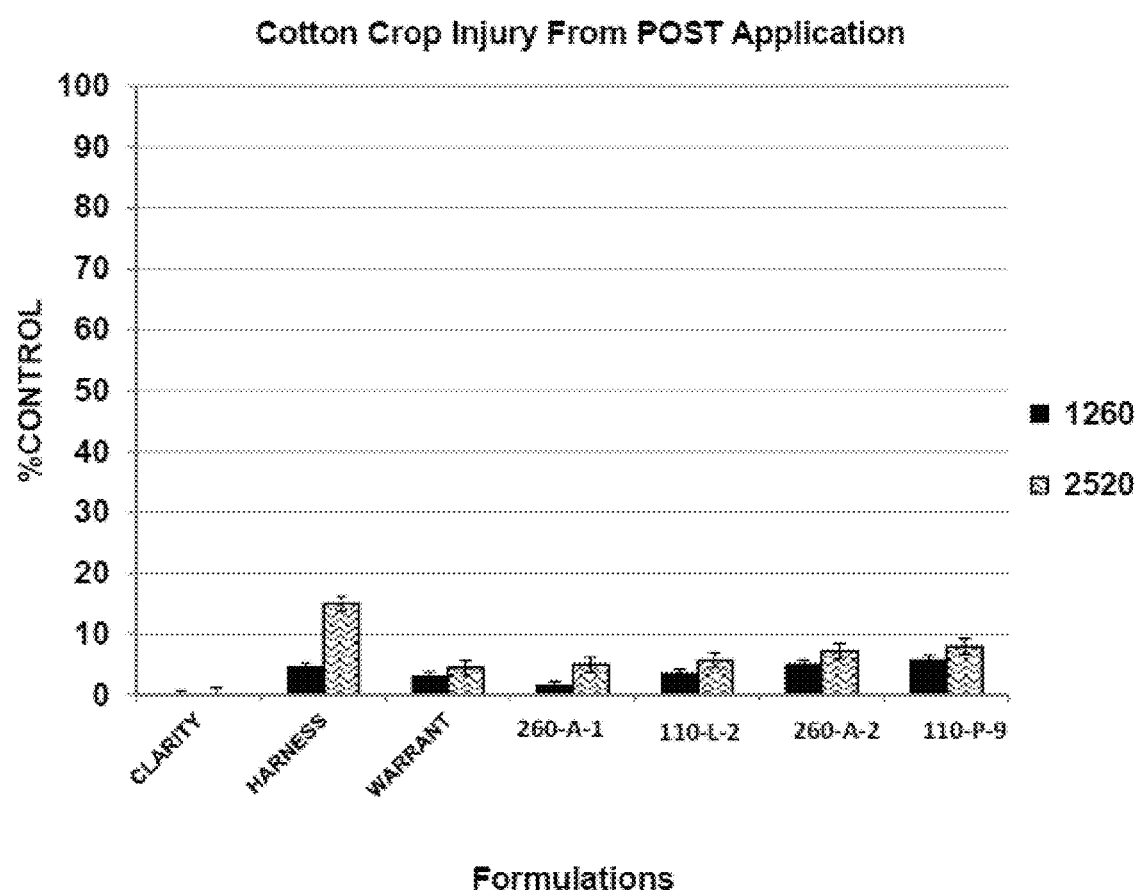

FIGS. 1-2 show the results for the crop injury for soybean and cotton, respectively.

The release rate test and crop safety tests on soybean and cotton were repeated for the formulations described in Table 6-2. Table 6-3 presents the results for the crop safety tests for soybean and cotton. Crop injury is reported as a mean percentage calculated by the least squares method. Crop injury is compared to applications of commercial products HARNESS (available from Monsanto Co.) and CLARITY (available from BASF) at the rates specified in Table 6-3. HARNESS contains unencapsulated acetochlor herbicide in an emulsifiable concentrate. CLARITY contains the diglycolamine salt of dicamba. The WARRANT Premix formulation was prepared by mixing commercial WARRANT concentrate (available from Monsanto Co.) with a sodium dicamba concentrate.

TABLE 6-2

| Formulation No. | Acetochlor (% a.i.) | Dicamba (% a.e.) | Dicamba salt | Calcium chloride (wt. %) | 24-hour Acetochlor release rate (ppm) |
|---|---|---|---|---|---|
| Control | 33 | — | — | — | 105.8 |
| WARRANT Premix | 26.4 | 11.7 | Na | 0.8 | 116.0 |
| 260-A-1 | 26.4 | 11.7 | DGA | — | 315.4 |
| 260-A-2 | 26.4 | 11.7 | Na | — | 251.5 |
| 110-L-2 | 26.4 | 11.7 | DGA | 0.9 | 146 |
| 110-P-9 | 26.4 | 11.7 | Na | 0.8 | 109.3 |

TABLE 6-3

| Formulation No. | Application rate (g/ha) | Soybean Injury (%) | Cotton Injury (%) |
|---|---|---|---|
| HARNESS | 1260 | 11.3 | 7.1 |
| HARNESS | 2520 | 26.3 | 16.9 |
| CLARITY | 560 | 0.0 | 0.1 |
| CLARITY | 1120 | 0.0 | 1.6 |
| WARRANT Premix | 1260 | 0.5 | 0.8 |
| WARRANT Premix | 2520 | 3.8 | 0.7 |
| 260-A-1 | 1260 | 3.3 | 3.5 |
| 260-A-1 | 2520 | 10.8 | 6.3 |

TABLE 6-3-continued

| Formulation No. | Application rate (g/ha) | Soybean Injury (%) | Cotton Injury (%) |
|---|---|---|---|
| 260-A-2 | 1260 | 4.1 | 1.0 |
| 260-A-2 | 2520 | 5.3 | 2.1 |
| 110-L-2 | 1260 | 1.2 | 0.4 |
| 110-L-2 | 2520 | 1.6 | 2.8 |
| 110-P-9 | 1260 | 2.5 | 0.2 |
| 110-P-9 | 2520 | 2.4 | 2.4 |

The results show that formulations containing calcium chloride (Formulation Nos. 110-L-2, 110-P-9, and the WARRANT Premix) exhibited lower 24-hour acetochlor release rates and generally lower crop injury when compared to similar formulations but not containing calcium chloride (Formulation Nos. 260-A-1 and 260-A-2).

The results also show that crop injury was generally lower for Formulation No. 260-A-2, which contained sodium dicamba, as compared to Formulation No. 260-A-1, which contained DGA dicamba, especially at the higher application rate of 2520 g/ha. The crop injury for Formulation No. 260-A-2 was also comparable to formulations containing calcium chloride, especially for cotton. The crop safety results for Formulation No. 260-A-2 is surprising since the 24-hour acetochlor release rate for this formulation was as much as 2.5 times greater than the formulations containing calcium chloride.

Example 7

A series of herbicidal premix concentrates containing WARRANT (microencapsulated acetochlor available from Monsanto Co., St. Louis, Mo.) and selected co-herbicides were prepared by mixing the two components in water to the concentrations specified in Table 7-1. A polyvalent metal salt (calcium chloride) was added to each concentrate during formulation as a release modulating agent. The release rate test described in Example 2 was repeated. The results are also provided in Table 7-1.

TABLE 7-1

Effect of Selected Co-Herbicides on Acetochlor Release and the Effect of $Ca^{2+}$ on the Release Rate

| Formulation No. | Acetochlor (% a.i.) | Co-Herbicide | Co-Herbicide (wt. %) | $CaCl_2$ (wt. %) | 24-hour Acetochlor release rate (ppm) |
|---|---|---|---|---|---|
| 110-A-5 | 30.85 | Fomesafen | 15.43 | 0 | 412.7 |
| 110-A-6 | 26.88 | Fomesafen | 13.44 | 1.43 | 111.7 |
| 110-A-7 | 25.04 | Glufosinate | 18.78 | 0 | 521.3 |
| 110-A-8 | 21.95 | Glufosinate | 16.46 | 1.17 | 272.1 |

Example 8

A series of herbicidal concentrates containing WARRANT (microencapsulated acetochlor) and were prepared to the concentrations specified in Table 8-1. A polyvalent metal salt (calcium acetate) was added to selected concentrates during formulation. The release rate test described in Example 2 was repeated. The results are also provided in Table 8-1.

TABLE 8-1

Modulation of the Release Rate of WARRANT with Calcium Acetate

| Formulation No. | Acetochlor (% a.i.) | Calcium acetate (wt. %) | 24-hour Acetochlor release rate (ppm) |
|---|---|---|---|
| Control | 33.0 | 0 | 148 |
| 758-K-1 | 32.9 | 0.24 | 146 |
| 758-K-2 | 32.8 | 0.48 | 111 |
| 758-K-3 | 32.7 | 0.94 | 88 |
| 758-K-4 | 32.3 | 1.84 | 78 |

Example 9

Figure 3:
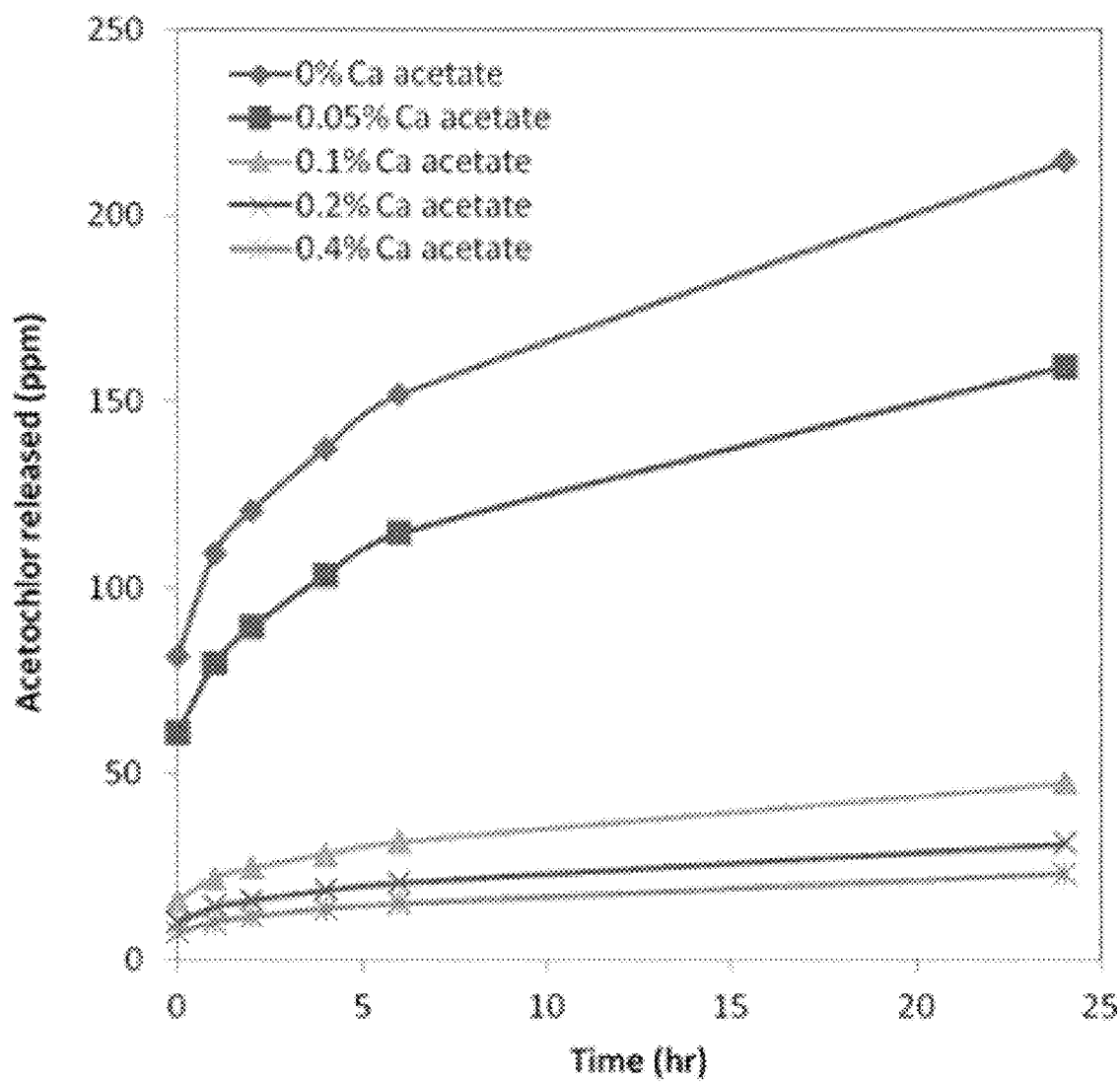
FIGS. 3 and 4 show the effect of the release modulating agent on the release rate on an application mixture prepared from a commercial DEGREE (microencapsulated acetochlor) concentrate.
Figure 4:
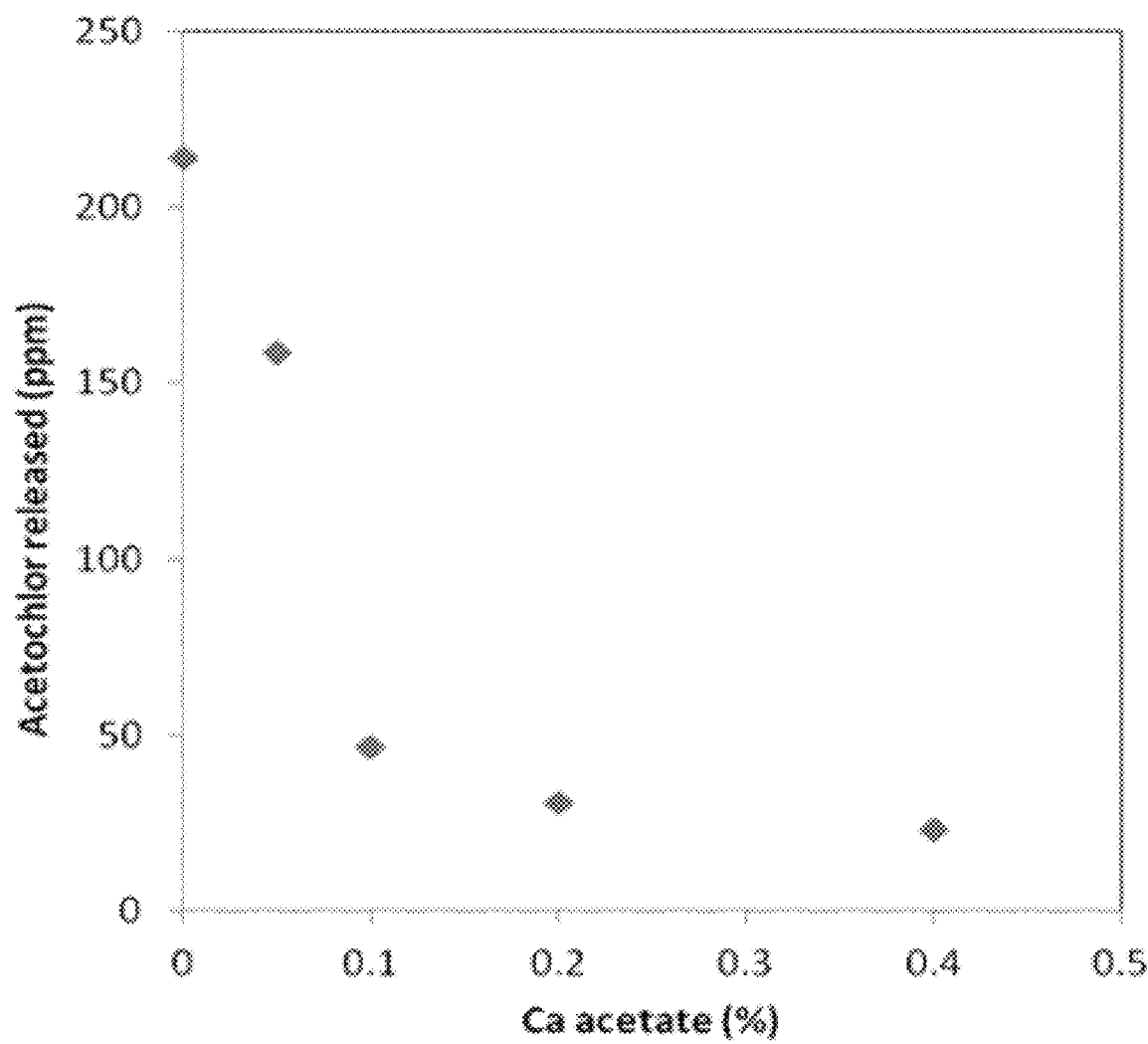

A series of application mixtures (1 wt. % a.i.) were prepared from commercial DEGREE concentrates (microencapsulated acetochlor available from Monsanto Co., St. Louis, Mo.). A polyvalent metal salt (calcium acetate) was added to each mixture. The release rate test described in Example 2 was repeated. The results are provided in FIGS. 3 and 4. The results show that the acetochlor release rate decreases with increase concentration of polyvalent metal ion (e.g., calcium).

Example 10

A series of herbicidal premix concentrates were prepared by mixing WARRANT (microencapsulated acetochlor) and selected dicamba salts to the concentrations specified in Table 10-1 along with additional components including a dispersant and stabilizer. Sodium acetate was also added as a volatility control additive. The amount of polyvalent metal salt (calcium chloride) added to each formulation was varied from 0.0 to 1.6 wt. %. The release rate test described in Example 2 was performed for these formulations. The results are also provided in Table 10-1.

TABLE 10-1

| Formulation No. | Acetochlor (% a.i.) | Dicamba (% a.e.) | Dicamba salt | Calcium chloride (wt. %) | Sodium acetate (wt. %) | 24-hour Acetochlor release rate (ppm) |
|---|---|---|---|---|---|---|
| 100218 | 26.4 | 11.7 | Na | 0.8 | 3.3 | 112 |
| 100219 | 26.4 | 11.7 | Na | 0.4 | 3.3 | 171 |
| 100220 | 26.4 | 11.7 | Na | 0.0 | 3.3 | 252 |
| 100222 | 26.4 | 11.7 | DGA | 0.0 | 3.3 | 317 |
| 100226 | 26.4 | 11.7 | Na | 1.6 | 3.3 | — |

A series of crop safety field trials were conducted in fields of cotton (*Gossypium hirsutum*, GOSHI) and soybeans (*Glycine max*, GLXMA). Time of application was post emergent to the crops, and treatments were applied using a back-pack or tractor mounted sprayer. Application mixtures prepared from the formulations listed in Table 10-1 were applied under field conditions at application rates of 1.26 kg/ha and 2.52 kg/ha of acetochlor (a.i.) and 0.56 kg/ha and 1.12 kg/ha of dicamba (a.e.). For comparison, field trials with tank mixed application mixtures of CLARITY with WARRANT and CLARITY with DUAL II MAGNUM (unencapsulated S-metolachlor herbicide in an emulsifiable concentrate available from Syngenta) were also performed.

Crop injury was assessed three days after treatment. The results of the crop safety field trials are presented in Table 10-2. The results are reported relative to the crop injury that was produced using an application mixture of CLARITY with WARRANT. A crop injury score that is ≥0 but <1 indicates that the crop injury cannot be distinguished from the crop injury that was produced using an application mixture of CLARITY with WARRANT. A crop injury score that is >1 indicates that the crop injury is significantly less injurious from the crop injury that was produced using an application mixture of CLARITY with WARRANT. A crop injury score that is <0 indicates that the crop injury is significantly more injurious from the crop injury that was produced using an application mixture of CLARITY with WARRANT.

TABLE 10-2

1X Rate Necrosis at 3 Days After Treatment as compared to Necrosis with CLARITY + WARRANT

| Formulation No. | All Data | n | GOSHI | n | GLXMA | n |
|---|---|---|---|---|---|---|
| CLARITY + DUAL II MAGNUM | −9.3 | 68 | −5.8 | 36 | −13.3 | 32 |
| 100218 | 0.5 | 68 | 0.9 | 36 | 0.0 | 32 |
| 100219 | 0.2 | 68 | 0.4 | 36 | 0.0 | 32 |
| 100220 | 0.3 | 68 | 1.0 | 36 | −0.5 | 32 |
| 100222 | −0.7 | 68 | −1.3 | 36 | 0.0 | 32 |

TABLE 10-3

2X Rate Necrosis at 3 Days After Treatment as compared to Necrosis with CLARITY + WARRANT

| Formulation | All Data | n | GOSHI | n | GLXMA | n |
|---|---|---|---|---|---|---|
| CLARITY + DUAL II MAGNUM | −16.1 | 68 | −6.5 | 36 | −26.9 | 32 |
| 100218 | 2.4 | 68 | 4.4 | 36 | 0.2 | 32 |
| 100219 | 1.1 | 68 | 1.8 | 36 | 0.2 | 32 |
| 100220 | 1.6 | 68 | 2.8 | 36 | 0.3 | 32 |
| 100222 | −0.8 | 68 | −1.4 | 36 | −0.1 | 32 |

The results show that the tank mix application mixture of CLARITY (diglycolamine salt of dicamba) and DUAL II MAGNUM (unencapsulated S-metolachlor) was significantly more injurious to cotton and soybeans as compared to the control (tank mix application mixture containing CLARITY and WARRANT). Formulation 100222 was also injurious to cotton and soybeans, but to a much less extent as compared to tank mix application mixture of CLARITY and DUAL II MAGNUM. Formulations 100218 and 100219, which contain a polyvalent metal cation (calcium chloride) for modulating acetochlor release, were significantly less injurious as compared to the control. Further, although formulation 100220 exhibited an elevated 24-hour acetochlor release rate of 252 ppm, this formulation unexpectedly provided acceptable crop safety, especially at the higher application rate.

Example 11

Volatility tests were conducted for spray solutions prepared from the concentrates described in Example 10. Spray solutions of CLARITY and a mix of CLARITY and WARRANT (i.e., spray solutions that did not contain the volatility control additive) were also subjected to the volatility tests for comparison. The protocol for the volatility tests are described below.

Humidomes (24.25 L) obtained from Hummert International (Part Nos 14-3850-2 for humidomes and 11-3050-1 for 1020 flat tray) were modified by cutting a 2.2 cm diameter hole on one end approximately 5 cm from the top to allow for insertion of a glass air sampling tube (22 mm OD) containing a polyurethane foam (PUF) filter. The sampling tube was secured with a VITON o-ring on each side of the humidome wall. The air sampling tube external to the humidome was fitted with tubing that was connected to a vacuum manifold immediately prior to sampling.

The flat tray beneath the humidome was filled with 1 liter of sifted dry or wet 50/50 soil (50% Redi-Earth and 50% US 10 Field Soil) to a depth of about 1 cm. Spray solutions of each formulation were prepared to contain 1.2% a.e. dicamba, which is equivalent to an application rate of 1.0 lb/A a.e. at 10 gallons per acre (GPA), and then sprayed onto the soil of each humidome. Four separate humidome boxes were sprayed to have four replicate measurements for each formulation.

The flat tray bottom containing the dicamba formulation on soil was covered with the humidome lid and the lid was secured with clamps. The assembled humidomes were placed in a temperature and humidity controlled environment and connected to a vacuum manifold through the air sampling line. The humidome chambers were set at 35° C. and 40% relative humidity (RH). Air was drawn through the humidome and PUF at a rate of 2 liters per minute (LPM) for 24 hours at which point the air sampling was stopped. The humidomes were then removed from the controlled environment and the PUF filter was removed. The PUF filter was extracted with 20 mL of methanol and the solution was analyzed for dicamba concentration using LC-MS methods known in the art.

Table 11-1 provides the mean concentration of dicamba in air for the tested formulations. The results show that the sodium acetate was effective in reducing the volatility of dicamba by a factor of ten as compared to a CLARITY spray solution and a CLARITY and WARRANT spray solution.

TABLE 11-1

| Formulation | Dicamba concentration in air (ng/L) |
|---|---|
| CLARITY | 0.057 |
| CLARITY + WARRANT | 0.061 |
| 100218 | 0.005 |
| 100220 | 0.006 |
| 100226 | 0.006 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. An aqueous herbicidal concentrate composition comprising:
   (a) at least one particulate microencapsulated acetamide herbicide dispersed in an aqueous liquid medium comprising a water-immiscible core material comprising the acetamide herbicide and a polyurea shell wall containing the core material, wherein the acetamide herbicide concentration in the composition on an active ingredient basis is at least about 10 wt. % and wherein the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea and wherein the ratio of amine molar equivalents contained in the polyamine component to isocyanate molar equivalents contained in the polyisocyanate component is at least 1.01:1; and
   (b) a release modulating agent comprising a polyvalent metal cation, wherein the molecular weight of the release modulating agent is no greater than about 1000 g/mol, and
   wherein the ratio of moles of polyvalent metal cation to amine molar equivalents contained in the polyamine component is from about 0.05:1 to about 1.5:1.

2. The aqueous herbicidal concentrate composition of claim 1 wherein the polyvalent metal cation comprises an ion of a metal selected the group consisting of magnesium, calcium, aluminum, manganese, iron, copper, zinc, and combinations thereof.

3. The aqueous herbicidal concentrate composition of claim 1 wherein the release modulating agent comprises an anion selected from the group consisting of acetate, citrate, carbonate, oxalate, and combinations thereof.

4. The aqueous herbicidal concentrate composition of claim 1 wherein the release modulating agent comprises a combination of at least two salts comprising polyvalent metal cations of a metal selected the group consisting of magnesium, calcium, aluminum, manganese, iron, copper, zinc, and combinations thereof.

5. The aqueous herbicidal concentrate composition of claim 1 wherein the ratio of moles of polyvalent metal cation to amine molar equivalents contained in the polyamine component is from about 0.3:1 to about 1.5:1.

6. The aqueous herbicidal concentrate composition of claim 1 wherein the concentration of the acetamide herbicide on an active ingredient basis is from about 15 wt. % to about 60 wt. %.

7. The aqueous herbicidal concentrate composition of claim 1 wherein the acetamide herbicide is selected from the group consisting of acetochlor, alachlor, butachlor, butenachlor, delachlor, diethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and combinations thereof.

8. The aqueous herbicidal concentrate composition of claim 1 wherein the acetamide herbicide comprises acetochlor.

9. The aqueous herbicidal concentrate composition of claim 1 the ratio of amine molar equivalents contained in the polyamine component to isocyanate molar equivalents contained in the polyisocyanate component is at least about 1.05:1.

10. The aqueous herbicidal concentrate composition of claim 1 further comprising one or more co-herbicides selected from acetyl CoA carboxylase inhibitors, enolpyruvyl shikimate-3-phosphate synthase inhibitors, glutamine synthetase inhibitors, auxins, photosystem II inhibitors, acetolactate synthase or acetohydroxy acid synthase inhibitors, photosystem I inhibitors, mitosis inhibitors, protoporphyrinogen oxidase inhibitors, cellulose inhibitors, oxidative phosphorylation uncouplers, dihydropteroate synthase inhibitors, fatty acid and lipid biosynthesis inhibitors, auxin transport inhibitors and carotenoid biosynthesis inhibitors, salts and esters thereof, racemic mixtures and resolved isomers thereof, and mixtures thereof.

11. A liquid herbicidal mixture comprising:
   (a) at least one particulate microencapsulated acetamide herbicide dispersed in an aqueous liquid medium comprising a water-immiscible core material comprising the acetamide herbicide and a polyurea shell wall containing the core material, wherein the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea;
   (b) a release modulating agent comprising a polyvalent metal cation, wherein the molecular weight of the release modulating agent is no greater than about 1000 g/mol; and
   (c) an acidic co-herbicide; and
   wherein the ratio of moles of polyvalent metal cation to amine molar equivalents contained in the polyamine component is from 0.05:1 to 1.5:1.

12. The herbicidal mixture of claim 11 wherein the acetamide herbicide concentration on an active ingredient basis is from about 10 wt. % to about 65 wt. %.

13. The herbicidal mixture of any claim 11 wherein the ratio of moles of polyvalent metal cation to amine molar equivalents contained in the polyamine component is from about 0.3:1 to about 1.5:1.

14. The herbicidal mixture of claim 11 wherein the acidic co-herbicide comprises an auxin herbicide selected from the group consisting of 2,4-D, 2,4-DB, dichloroprop, MCPA, MCPB, aminopyralid, clopyralid, fluroxypyr, triclopyr, diclopyr, mecoprop, dicamba, picloram and quinclorac, salts and esters thereof, and mixtures thereof.

15. The herbicidal mixture of claim 11 wherein the acidic co-herbicide comprises at least one herbicide selected from the group consisting glyphosate, fomesafen, mesotrione, glufosinate, dicamba, salts and esters thereof, and combinations thereof.

16. The herbicidal mixture of claim 11 wherein the polyvalent metal cation comprises an ion of a metal selected the group consisting of magnesium, calcium, aluminum, manganese, iron, copper, zinc, and combinations thereof.

17. The herbicidal mixture of claim 11 wherein the release modulating agent comprises an anion selected from the group consisting of acetate, citrate, carbonate, oxalate, and combinations thereof.

18. The herbicidal mixture of claim 11 wherein the acetamide herbicide is selected from the group consisting of acetochlor, alachlor, butachlor, butenachlor, delachlor, diethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and combinations thereof.

19. The herbicidal mixture of claim 11 wherein the acetamide herbicide comprises acetochlor.

20. The herbicidal mixture of claim 11 wherein the weight ratio of acetamide herbicide to acidic co-herbicide is from about 1:30 to about 30:1.

* * * * *